(12) United States Patent
Meier et al.

(10) Patent No.: US 7,429,279 B2
(45) Date of Patent: Sep. 30, 2008

(54) DYE MIXTURES OF FIBER-REACTIVE AZO DYES, THEIR PREPARATION AND THEIR USE

(75) Inventors: Stefan Meier, Frankfurt am Main (DE); Werner Russ, Flörsheim-Wicker (DE); Joachim Eichhorn, Frankfurt (DE)

(73) Assignee: DyStar Textilfarben GmbH + Co. Deutschland KG (DE)

( * ) Notice: Subject to any disclaimer, the term of this patent is extended or adjusted under 35 U.S.C. 154(b) by 217 days.

(21) Appl. No.: 10/899,163

(22) Filed: Jul. 26, 2004

(65) Prior Publication Data

US 2005/0034253 A1    Feb. 17, 2005

(30) Foreign Application Priority Data

Aug. 16, 2003  (DE) ................. 103 37 636

(51) Int. Cl.
*C09B 67/30* (2006.01)
(52) U.S. Cl. ............. 8/641; 8/669; 8/670; 8/681; 8/682; 8/687; 8/688
(58) Field of Classification Search .......... 8/641, 8/636, 669, 670, 681, 682, 687, 688
See application file for complete search history.

(56) References Cited

U.S. PATENT DOCUMENTS

| | | | |
|---|---|---|---|
| 4,485,041 A | | 11/1984 | Hoyer et al. |
| 5,231,172 A | | 7/1993 | Beck et al. |
| 5,393,307 A | * | 2/1995 | Schwarz et al. ............ 8/549 |
| 5,529,585 A | | 6/1996 | Schrell et al. |
| 5,556,435 A | | 9/1996 | Russ et al. |
| 5,986,087 A | | 11/1999 | Schrell et al. |
| 6,001,995 A | | 12/1999 | Schrell et al. |
| 6,011,140 A | * | 1/2000 | Zamponi et al. ............ 534/637 |
| 6,090,164 A | | 7/2000 | Steckelberg et al. |
| 6,156,231 A | * | 12/2000 | McKedy ............ 252/188.28 |
| 6,159,251 A | * | 12/2000 | Pedemonte et al. ............ 8/639 |
| 6,537,332 B1 | | 3/2003 | Tzikas et al. |
| 2003/0140432 A1 | | 7/2003 | Eichhorn et al. |

FOREIGN PATENT DOCUMENTS

| | | |
|---|---|---|
| DE | 27 48 965 | 5/1979 |
| DE | 196 00 765 | 7/1997 |
| EP | 0 538 785 | 4/1993 |
| EP | 0 668 328 A2 | 8/1995 |
| EP | 0 681 007 | 11/1995 |
| EP | 0 692 559 | 1/1996 |
| EP | 0 719 841 | 7/1996 |
| EP | 0 957 137 | 11/1999 |
| EP | 1 013 720 B1 | 6/2000 |
| EP | 1 013 729 | 6/2000 |
| WO | WO-96/37641 | 11/1996 |
| WO | WO-96/37642 | 11/1996 |
| WO | WO-00/06652 | 2/2000 |
| WO | WO-02/098988 | 12/2002 |
| WO | WO-03/080739 | 10/2003 |
| WO | WO-2005/040285 A1 | 5/2005 |

* cited by examiner

*Primary Examiner*—Lorna M. Douyon
*Assistant Examiner*—Amina Khan
(74) *Attorney, Agent, or Firm*—Connolly Bove Lodge + Hutz LLP

(57) ABSTRACT

Reactive dye mixtures which comprise one or more dyes of the indicated general formula (i)

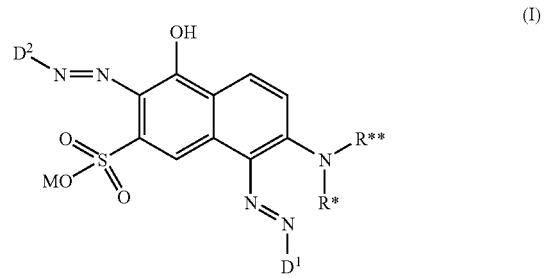

and one or more dyes of the hereinbelow indicated and defined general formula (II)

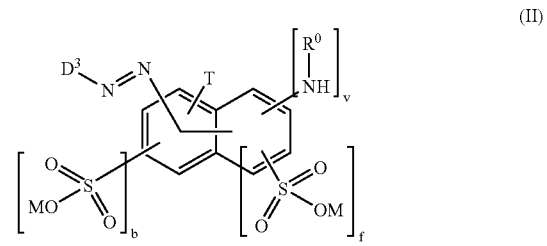

where $D^1$, $D^2$, $D^3$, $R^0$, $R^*$, $R^{**}$, T, b, f, v and M are each as defined in claim 1, the dyes of the general formulae (I) and (II) containing at least one fiber-reactive group of the formula —$SO_2$-Z or $Z^2$, their preparation and their use for dyeing and printing hydroxyl- and/or carboxamido-containing fiber material.

10 Claims, No Drawings

DYE MIXTURES OF FIBER-REACTIVE AZO DYES, THEIR PREPARATION AND THEIR USE

The invention relates to the technical field of fiber-reactive azo dyes.

Fiber-reactive azo dye mixtures and their use for dyeing hydroxyl- and/or carboxamido-containing material in orange to red hues are known for example from the documents EP 0 681 007, EP 1 013 729, EP 0 957 137 and EP 0 719 841. However, these have certain performance defects, for example an excessive dependence of the color yield on changing dyeing parameters in the dyeing operation, or an insufficient or unlevel color buildup on cotton (good color buildup follows from the ability of a dye to produce the correspondingly stronger dyeing from an increased concentration of dye in the dyebath). Possible consequences of these defects are for example poor reproducibilities for the dyeings which are obtainable, which ultimately compromises the economics of the dyeing operation. Consequently, there continues to be a demand for novel reactive dyes or reactive dye mixtures having improved properties, such as high substantivity combined with good washoff for unfixed portions. They shall moreover also provide good dyeing yields and possess high reactivity and they shall more particularly provide dyeings having high degrees of fixation.

The present invention, then, provides dye mixtures which possess these above-described properties to a high degree. The novel dye mixtures are notable in particular for high yields of fixation and ready washoff for portions not fixed on the fiber. In addition, the dyeings exhibit good general fastnesses, such as for example high lightfastness and very good wetfastnesses, and also have a low tendency to stain polyamide in the case of cotton-polyamide blend fabrics.

The invention accordingly provides dye mixtures which comprise one or more, such as two or three, preferably 1 or 2, dyes of the hereinbelow indicated and defined general formula (I)

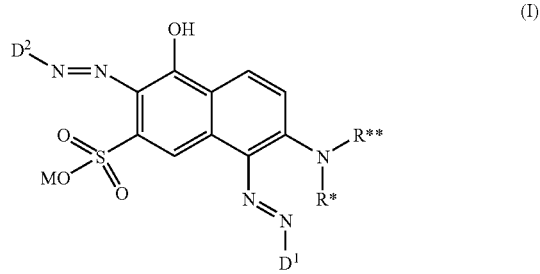
(I)

and one or more, such as two or three, preferably 1 or 2, dyes of the hereinbelow indicated and defined general formula (II)

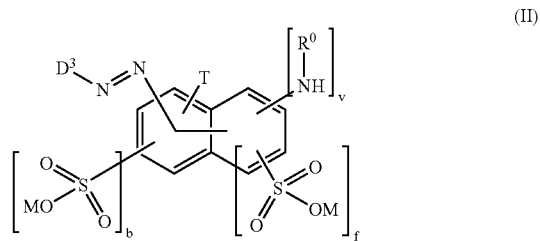
(II)

and also optionally one or more, such as two or three, preferably 1 or 2, dyes of the hereinbelow indicated and defined general formulae (Ga) to (Gf)

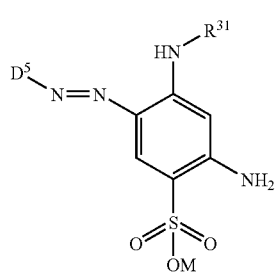
(Ga)

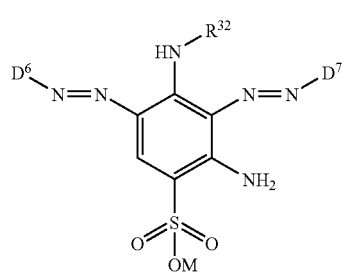
(Gb)

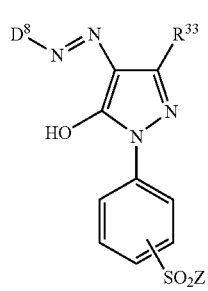
(Gc)

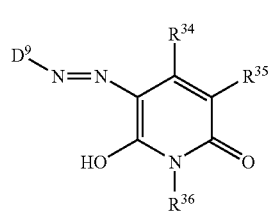
(Gd)

-continued

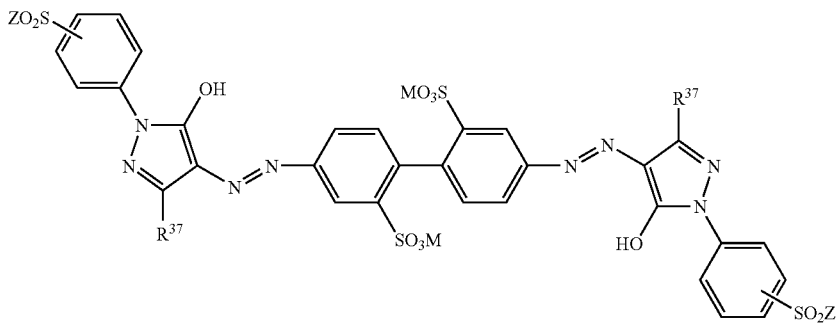
(Ge)

(Gf)

where
$D^1$ to $D^3$ and $D^5$ to $D^9$ are independently a group of the general formula (1)

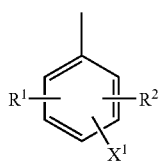
(1)

where
$R^1$ and $R^2$ are independently hydrogen, $(C_1$-$C_4)$-alkyl, $(C_1$-$C_4)$-alkoxy, hydroxyl, sulfo, carboxyl, cyano, nitro, amido, ureido or halogen; and $X^1$ is hydrogen or a group of the formula —$SO_2$-Z, where Z is —CH=$CH_2$, —$CH_2CH_2Z^1$ or hydroxyl, where $Z^1$ is hydroxyl or an alkali-detachable group, or $D^1$ to $D^3$ and $D^5$ to $D^9$ are independently a naphthyl group of the general formula (2)

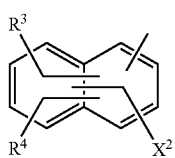
(2)

where
$R^3$ and $R^4$ are independently hydrogen, $(C_1$-$C_4)$-alkyl, $(C_1$-$C_4)$-alkoxy, hydroxyl, sulfo, carboxyl, cyano, nitro, amido, ureido or halogen; and $X^2$ has one of the meanings of $X^1$; or $D^1$ to $D^3$ and $D^5$ to $D^9$ are independently a group of the general formula (3)

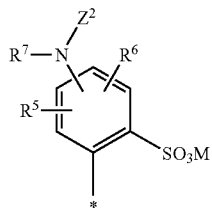
(3)

where
$R^5$ and $R^6$ independently have one of the meanings of $R^1$ and $R^2$;

$R^7$ is hydrogen, $(C_1$-$C_4)$-alkyl, unsubstituted or $(C_1$-$C_4)$-alkyl-, $(C_1$-$C_4)$-alkoxy-, sulfo-, halogen- or carboxyl-substituted phenyl; and $Z^2$ is a group of the general formula (4) or (5) or (6)

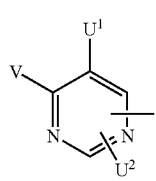
(4)

-continued

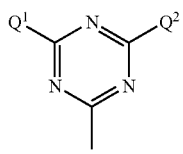
(5)

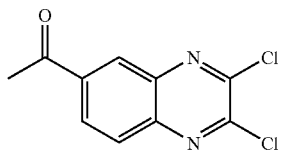
(6)

where

V is fluorine or chlorine;

$U^1$, $U^2$ are independently fluorine, chlorine or hydrogen; and $Q^1$, $Q^2$ are independently chlorine, fluorine, cyanamide, hydroxyl, $(C_1\text{-}C_6)$-alkoxy, phenoxy, sulfophenoxy, mercapto, $(C_1\text{-}C_6)$-alkylmercapto, pyridino, carboxypyridino, carbamoylpyridino or a group of the general formula (7) or (8)

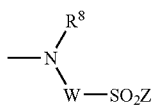
(7)

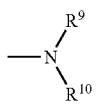
(8)

where $R^8$ is hydrogen or $(C_1\text{-}C_6)$-alkyl, sulfo-$(C_1\text{-}C_6)$-alkyl or phenyl which is unsubstituted or substituted by $(C_1\text{-}C_4)$-alkyl, $(C_1\text{-}C_4)$-alkoxy, sulfo, halogen, carboxyl, acetamido, ureido;

$R^9$ and $R^{10}$ independently have one of the meanings of $R^8$ or combine to form a cyclic ring system of the formula —$(CH_2)_j$—, wherein j is 4 or 5, or alternatively —$(CH_2)_2$-E-$(CH_2)_2$—, wherein E is oxygen, sulfur, sulfonyl, —$NR^{11}$ where $R^{11}=(C_1\text{-}C_6)$-alkyl;

W is phenylene, which is unsubstituted or substituted by 1 or 2 substituents, such as $(C_1\text{-}C_4)$-alkyl, $(C_1\text{-}C_4)$-alkoxy, carboxyl, sulfo, chlorine, bromine, or is $(C_1\text{-}C_4)$-alkylenearylene or $(C_2\text{-}C_6)$-alkylene, which may be interrupted by oxygen, sulfur, sulfonyl, amino, carbonyl, carboxamido, or is phenylene-CONH-phenylene which is unsubstituted or substituted by $(C_1\text{-}C_4)$-alkyl, $(C_1\text{-}C_4)$-alkoxy, hydroxyl, sulfo, carboxyl, amido, ureido or halogen, or is naphthylene which is unsubstituted or substituted by one or two sulfo groups; and Z is as defined above; or $D^1$ to $D^3$ and $D^5$ to $D^9$ are independently a group of the general formula (9)

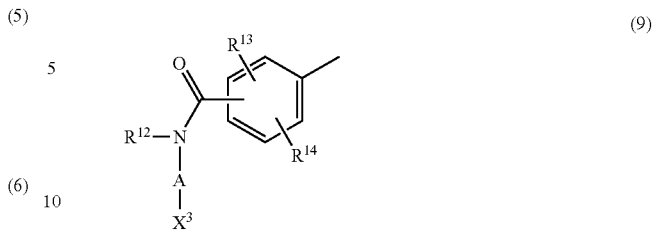
(9)

where $R^{12}$ is hydrogen, $(C_1\text{-}C_4)$-alkyl, aryl or a substituted aryl radical;

$R^{13}$ and $R^{14}$ are independently hydrogen, $(C_1\text{-}C_4)$-alkyl, $(C_1\text{-}C_4)$-alkoxy, hydroxyl, sulfo, carboxyl, cyano, nitro, amido, ureido or halogen; and A is a phenylene group of the general formula (10)

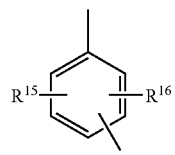
(10)

where $R^{15}$ and $R^{16}$ are independently hydrogen, $(C_1\text{-}C_4)$-alkyl, $(C_1\text{-}C_4)$-alkoxy, hydroxyl, sulfo, carboxyl, cyano, nitro, amido, ureido or halogen; or A is a naphthylene group of the general formula (11)

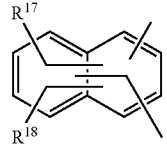
(11)

where $R^{17}$ and $R^{18}$ are independently hydrogen, $(C_1\text{-}C_4)$-alkyl, $(C_1\text{-}C_4)$-alkoxy, hydroxyl, sulfo, carboxyl, cyano, nitro, amido, ureido or halogen; or A is a polymethylene group of the general formula (12)

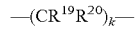
—$(CR^{19}R^{20})_k$— (12)

where k is an integer greater than 1 and $R^{19}$ and $R^{20}$ are independently hydrogen, $(C_1\text{-}C_4)$-alkyl, $(C_1\text{-}C_4)$-alkoxy, hydroxyl, cyano, amido, halogen or aryl; and $X^3$ has one of the meanings of $X^1$; and $R^0$ is hydrogen or a group of the general formula (4) or (5) or $R^0$ is a group of the general formula (13)

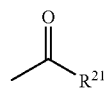
(13)

where
R$^{21}$ is (C$_1$-C$_6$)-alkyl, sulfo-(C$_1$-C$_6$)-alkyl, carboxy-(C$_1$-C$_6$)-alkyl or phenyl which is unsubstituted or substituted by (C$_1$-C$_4$)-alkyl, (C$_1$-C$_4$)-alkoxy, sulfo, halogen, carboxyl, acetamido, ureido; or R° is a group of the general formula (100)

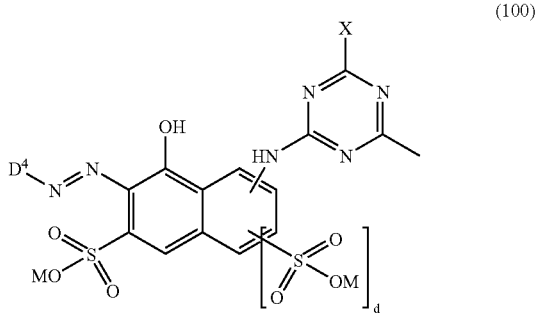

(100)

where

D$^4$ has one of the meanings of D$^1$ to D$^3$ or D$^5$ to D$^9$,

X is halogen or hydroxyl, d is 0 or 1; and

R*, R** are independently hydrogen, (C$_1$-C$_4$)-alkyl or a group of the formula (14) —CH$_2$—SO$_3$M (14);

b, f, v are independently 0 or 1; and

T is hydroxyl or NH$_2$ wherein v is 0 when T is NH$_2$;

R$^{31}$ is hydrogen, acetyl, carbamoyl or a group of the general formula (4) or (5) or (14), R$^{32}$ is hydrogen or a group of the general formula (14), R$^{33}$ is methyl, carboxyl or carboxyalkyl with C$_1$- to C$_4$-alkyl, R$^{34}$ is hydrogen or methyl, R$^{35}$ is hydrogen, cyano, carbamoyl, carboxyl or a group of the general formula (14), R$^{36}$ is methyl, ethyl or β-sulfoethyl, R$^{37}$ is methyl, carboxyl or carboxyalkyl with C$_1$- to C$_4$-alkyl, R$^{38}$ is acetamido, ureido, methyl or methoxy, R$^{39}$ is hydrogen, methyl or methoxy, m is 0 or 1, n is 1, 2 or 3, Z$^3$ has one of the meanings of Z$^2$, and M is hydrogen, an alkali metal or one equivalent of an alkaline earth metal wherein the dyes of the general formulae (I), (II) and (Ga)-(Gf) contain at least one fiber-reactive group of the formula —SO$_2$-Z or Z$^2$.

The individual symbols in the general formulae above and below can have identical or different meanings under their definition, irrespective of whether the symbols bear the same or a different designation.

(C$_1$-C$_4$)-Alkyl R may be straight-chain or branched and is in particular methyl, ethyl, n-propyl, isopropyl, n-butyl, isobutyl, sec-butyl or tert-butyl. Methyl and ethyl are preferred. The same logic applies to (C$_1$-C$_4$)-alkoxy groups.

Aryl R is in particular phenyl. Substituted aryl R$^8$ to R$^{10}$, R$^{12}$ or R$^{21}$ is in particular phenyl substituted by one, two or three independent groups selected from the group consisting of (C$_1$-C$_4$)-alkyl, (C$_1$-C$_4$)-alkoxy, hydroxyl, sulfo, carboxyl, amido and halogen.

Halogen R is in particular fluorine, chlorine or bromine, and fluorine and chlorine are preferred.

Alkali-eliminable Z$^1$ in the β-position of the ethyl group of Z include for example halogen atoms, such as chlorine and bromine, ester groups of organic carboxylic and sulfonic acids, such as alkylcarboxylic acids, substituted or unsubstituted benzenecarboxylic acids and substituted or unsubstituted benzenesulfonic acids, such as alkanoyloxy of 2 to 5 carbon atoms, especially acetyloxy, benzoyloxy, sulfobenzoyloxy, phenylsulfonyloxy and toluylsulfonyloxy, also acidic ester groups of inorganic acids, such as phosphoric acid, sulfuric acid and thiosulfuric acid (phosphato, sulfato and thiosulfato groups), similarly dialkylamino groups having alkyl groups of 1 to 4 carbon atoms in each case, such as dimethylamino and diethylamino.

Z is preferably vinyl, β-chloroethyl and particularly preferably β-sulfatoethyl.

The groups "sulfo", "carboxyl", "thiosulfato", "phosphato" and "sulfato" include not only their acid form but also their salt form. Accordingly, sulfo groups are groups conforming to the general formula —SO$_3$M, thiosulfato groups are groups conforming to the general formula —S—SO$_3$M, carboxyl groups are groups conforming to the general formula —COOM, phosphato groups are groups conforming to the general formula —OPO$_3$M$_2$ and sulfato groups are groups conforming to the general formula —OSO$_3$M, in each of which M is as defined above.

The dyes of the general formula (I), (II) and (Gg)-(Gf) may possess different fiber-reactive groups —SO$_2$Z within the meaning of Z. More particularly, the fiber-reactive groups —SO$_2$Z may be on the one hand vinylsulfonyl groups and on the other —CH$_2$CH$_2$Z$^1$ groups, preferably β-sulfatoethylsulfonyl groups. If the dyes of the general formula (I), (II) and (Gg)-(Gf) contain vinylsulfonyl groups in some instances, then the fraction of the respective dye with the vinylsulfonyl group is up to about 30 mol %, based on the respective amount of total dye.

Alkali M is in particular lithium, sodium or potassium. M is preferably hydrogen or sodium.

The radicals R* and R** in the general formula (I) are independently preferably hydrogen, methyl or a group of the formula (14), with hydrogen or a group of the formula (14) being particularly preferred.

R$^1$ and R$^2$ are preferably hydrogen, (C$_1$-C$_4$)-alkyl groups, (C$_1$-C$_4$)-alkoxy groups, sulfo or carboxyl and more preferably hydrogen, methyl, methoxy or sulfo. R$^3$ to R$^6$ and R$^{12}$ to R$^{20}$ are preferably hydrogen, R$^3$ to R$^6$, R$^{17}$ and R$^{18}$ are also preferably sulfo.

R$^7$ to R$^{10}$ are preferably hydrogen or methyl, R$^7$ and R$^8$ are also preferably phenyl and R$^9$ and R$^{20}$ are preferably 2-sulfoethyl, 2-, 3- or 4-sulfophenyl or R$^9$ and R$^{10}$ combine to form a cyclic ring system which preferably conforms to the formula —(CH$_2$)$_2$—O—(CH$_2$)$_2$—.

Examples of groups D$^1$ to D$^9$ of the general formulae (1) and (2) are 2-(β-sulfato-ethylsulfonyl)-phenyl, 3-(β-sulfatoethylsulfonyl)-phenyl, 4-(β-sulfatoethylsulfonyl)-phenyl, 2-carboxy-5-(β-sulfatoethylsulfonyl)-phenyl, 2-chloro-4-(β-sulfatoethyl-sulfonyl)-phenyl, 2-chloro-5-(β-sulfatoethylsulfonyl)-phenyl, 2-bromo-4-(β-sulfato-ethylsulfonyl)-phenyl, 2-sulfo-4-(β-sulfatoethylsulfonyl)-phenyl, 2-sulfo-5-(β-sulfato-ethylsulfonyl)-phenyl, 2-methoxy-5-(β-sulfatoethylsulfonyl)-phenyl, 2-ethoxy-5-(β-sulfatoethylsulfonyl)-phenyl, 2,5-dimethoxy-4-(β-sulfatoethylsulfonyl)-phenyl, 2-methoxy-5-methyl-4-(β-sulfatoethylsulfonyl)-phenyl, 2-methyl-4-(β-sulfatoethylsulfonyl)-phenyl, 2- or 3- or 4-(β-thiosulfatoethylsulfonyl)-phenyl, 2-methoxy-5-(β-thiosulfatoethylsulfonyl)-phenyl, 2-sulfo-4-(β-phosphatoethylsulfonyl)-phenyl, 2- or 3- or 4-vinylsulfonyl-phenyl, 2-sulfo-4-vinylsulfonyl-phenyl, 2-chloro-4-(β-chloro-ethylsulfonyl)-phenyl, 2-chloro-5-(β-chloroethylsulfonyl)-phenyl, 3- or 4-(β-acetoxyethylsulfonyl)-phenyl, 6- or 8-(β-sulfatoethylsulfonyl)-naphth-2-yl, 6-(β-sulfatoethylsulfonyl)-1-sulfo-naphth-2-yl and 8-(β-sulfatoethylsulfonyl)-6-sulfo-naphth-2-yl, preferably 3-(β-sulfatoethylsulfonyl)-phenyl, 4-(β-sulfatoethylsulfonyl)-phenyl, 2-sulfo-4-(β-sulfatoethylsulfonyl)-phenyl, 2-methoxy-5-(β-sulfato-ethylsulfonyl)-phenyl, 2,5-dimethoxy-4-(β-sulfatoethylsulfonyl)-phenyl, 2-methoxy-5-methyl-4-(β-sulfatoethylsulfonyl)-phenyl and 3- or 4-vinyl-sulfonyl-phenyl, or $D^1$ to $D^9$ conform to a group of the general formula (3) or (9) where $R^5$ to $R^7$ and $R^{12}$ to $R^{14}$ have the above-described preferred meanings.

When $D^1$ to $D^9$ is a group of the general formula (1) and $X^1$ is —$SO_2Z$, the $SO_2Z$ group is preferably disposed meta or para to the diazo group, and when $D^1$ to $D^9$ is a group of the general formula (2), the bond which leads to the diazo group is preferably attached to the naphthalene nucleus in the β-position.

When A is phenylene and $X^3$ is —$SO_2Z$, the $SO_2Z$ group is preferably disposed meta or para relative to the nitrogen atom. In the group of the general formula (9), the carboxamide group is preferably disposed para or meta relative to the diazo group. When A is naphthylene, the bond leading to the nitrogen atom is preferably attached to the naphthalene nucleus in the β-position.

Examples of substituents A are in particular 1,2-phenylene, 1,3-phenylene, 1,4-phenylene, 2-chloro-1,4-phenylene, 2-chloro-1,5-phenylene, 2-bromo-1,4-phenylene, 2-sulfo-1,4-phenylene, 2-sulfo-1,5-phenylene, 2-methoxy-1,5-phenylene, 2-ethoxy-1,5-phenylene, 2,5-dimethoxy-1,4-phenylene, 2-methoxy-5-methyl-1,4-phenylene, 2-methyl-1,4-phenylene, 2,6-naphthylene, 2,8-naphthylene, 1-sulfo-2,6-naphthylene, 6-sulfo-2,8-naphthylene or 1,2-ethylene and 1,3-propylene.

A is particularly preferably 1,3-phenylene, 1,4-phenylene, 2-sulfo-1,4-phenylene, 2-methoxy-1,5-phenylene, 2,5-dimethoxy-1,4-phenylene, 2-methoxy-5-methyl-1,4-phenylene or 1,2-ethylene and 1,3-propylene, and in the case of the two last-mentioned alkylene groups $R^{12}$ is preferably phenyl or 2-sulfophenyl.

k is preferably 2 or 3.

W is preferably 1,3-phenylene, 1,4-phenylene, 2-sulfo-1,4-phenylene, 2-methoxy-1,5-phenylene, 2,5-dimethoxy-1,4-phenylene, 2-methoxy-5-methyl-1,4-phenylene, 1,2-ethylene, 1,3-propylene.

Examples of the groups $Q^1$ and $Q^2$ in the general formula (5) are independently fluorine, chlorine, hydroxyl, methoxy, ethoxy, phenoxy, 3-sulfophenoxy, 4-sulfophenoxy, methylmercapto, cyanamido, amino, methylamino, ethylamino, morpholino, piperidino, phenylamino, methylphenylamino, 2-sulfophenylamino, 3-sulfophenylamino, 4-sulfophenylamino, 2,4-disulfophenylamino, 2,5-disulfophenylamino, 2-sulfoethylamino, N-methyl-2-sulfoethylamino, pyridino, 3-carboxypyridino 4-carboxypyridino, 3-carbamoylpyridino, 4-carbamoylpyridino, 2-(2-sulfatoethylsulfonyl)-phenylamino, 3-(2-sulfatoethylsulfonyl)-phenylamino, 4-(2-sulfatoethylsulfonyl)-phenylamino, N-ethyl-3-(2-sulfatoethylsulfonyl)-phenylamino, N-ethyl-4-(2-sulfatoethylsulfonyl)-phenylamino, 2-carboxy-5-(2-sulfatoethylsulfonyl)-phenylamino), 2-chloro-4-(2-sulfatoethylsulfonyl)-phenylamino, 2-chloro-5-(2-sulfatoethylsulfonyl)-phenylamino, 2-bromo-4-(2-sulfatoethylsulfonyl)-phenylamino, 2-sulfo-4-(2-sulfatoethylsulfonyl)-phenylamino, 2-sulfo-5-(2-sulfatoethylsulfonyl)phenylamino, 2-methoxy-5-(2-sulfatoethylsulfonyl)-phenylamino, 2,5-dimethoxy-4-(2-sulfatoethylsulfonyl)-phenylamino, 2-methoxy-5-methyl-4-(2-sulfatoethylsulfonyl)-phenylamino, 2-methyl-4-(2-sulfatoethylsulfonyl)-phenylamino, 2-(vinylsulfonyl)-phenylamino, 3-(vinylsulfonyl)-phenylamino, 4-(vinylsulfonyl)-phenylamino, N-ethyl-3-(vinylsulfonyl)-phenylamino, N-ethyl-4-(vinylsulfonyl)-phenylamino, 6-(2-sulfatoethylsulfonyl)-naphth-2-ylamino, 8-(2-sulfatoethylsulfonyl)-naphth-2-ylamino, 8-(2-sulfatoethyl-sulfonyl)-6-sulfo-naphth-2-ylamino, 3-(2-(2-sulfatoethylsulfonyl)-ethylcarbamoyl)-phenylamino, 4-(2-(2-sulfatoethylsulfonyl)-ethylcarbamoyl)-phenylamino, 3-(2-(vinylsulfonyl)-ethylcarbamoyl)-phenylamino, 4-(2-(2-vinylsulfonyl)-ethylcarbamoyl)-phenylamino, 4-(N-methyl-2-(2-sulfatoethylsulfonyl)-ethylcarbamoyl)-phenylamino, 4-(N-phenyl-2-(2-sulfatoethylsulfonyl)ethylcarbamoyl)phenylamino, 4-(3-(2-sulfatoethylsulfonyl)-phenylcarbamoyl)-phenylamino, 4-(4-(2-sulfatoethyl-sulfonyl))-phenylcarbamoyl)-phenylamino, 3-(3-(2-sulfatoethylsulfonyl)-phenylcarbamoyl)-phenylamino, 3-(4-(2-sulfatoethylsulfonyl)-phenylcarbamoyl)-phenylamino, 3-(2-sulfatoethylsulfonyl)-propylamino, N-methyl-N-(2-(2-sulfatoethylsulfonyl)-ethyl)-amino, N-phenyl-N-(2-(2-sulfatoethylsulfonyl)-ethyl)-amino, N-phenyl-N-(2-(2-sulfatoethylsulfonyl)-propyl)-amino.

Preferably, the groups $Q^1$ and $Q^2$ in the general formula (5) are independently fluorine, chlorine, cyanamido, morpholino, 2-sulfophenylamino, 3-sulfophenylamino, 4-sulfophenylamino, N-methyl-2-sulfoethylamino, 3-carboxypyridino, 4-carboxypyridino, 3-carbamoyl pyridino, 4-carbamoylpyridino, 3-(2-sulfatoethyl-sulfonyl)-phenylamino, 4-(2-sulfatoethylsulfonyl)-phenylamino, 3-(vinylsulfonyl)-phenylamino, 4-(vinylsulfonyl)-phenylamino, 4-(3-(2-sulfatoethylsulfonyl)-phenylcarbamoyl)-phenylamino, 4-(4-(2-sulfatoethylsulfonyl)-phenylcarbamoyl)-phenylamino, 3-(3-(2-sulfatoethylsulfonyl)-phenylcarbamoyl)-phenylamino, 3-(4-(2-sulfatoethylsulfonyl)-phenylcarbamoyl)-phenylamino, N-methyl-N-(2-(2-sulfatoethylsulfonyl)-ethyl)-amino, N-phenyl-N-(2-(2-sulfatoethylsulfonyl)-ethyl)-amino.

More preferably, the groups $Q^1$ and $Q^2$ in the general formula (5) are independently fluorine, chlorine, cyanamido, morpholino, 2-sulfophenylamino, 3-sulfophenylamino, 4-sulfophenylamino, 3-(2-sulfatoethylsulfonyl)-phenylamino, 4-(2-sulfatoethylsulfonyl)-phenylamino, 3-(vinylsulfonyl)-phenylamino, 4-(vinyl-sulfonyl)-phenylamino, N-methyl-N-(2-(2-sulfatoethylsulfonyl)-ethyl)-amino, N-phenyl-N-(2-(2-sulfatoethylsulfonyl)-ethyl)-amino. Examples of the group $Z^2$ and $Z^3$ are 2,4-difluoro-pyrimidin-6-yl, 4,6-difluoro-pyrimidin-2-yl, 5-chloro-2,4-difluoro-pyrimidin-6-yl, 5-chloro-4,6-difluoro-pyrimidin-2-yl, 4,5-difluoro-pyrimidin-6-yl, 5-chloro-4-fluoro-pyrimidin-6-yl, 2,4,5-trichloro-pyrimidin-6-yl, 4,5-dichloro-pyrimidin-6-yl, 2,4-dichloro-pyrimidin-6-yl, 4-fluoro-pyrimidin-6-yl, 4-chloro-pyrimidin-6-yl, or a group of the general formula (5) having the above-indicated examples of $Q^1$ and $Q^2$ or a group of the formula (6).

Preferably, $Z^2$ and $Z^3$ are 2,4-difluoropyrimidin-6-yl, 4,6-difluoropyrimidin-2-yl, 5-chloro-2,4-difluoropyrimidin-6-yl, 5-chloro-4,6-difluoropyrimidin-2-yl or a group of the general formula (5) having the above-indicated preferred groups $Q^1$ and $Q^2$.

More preferably, $Z^2$ and $Z^3$ are 2,4-difluoropyrimidin-6-yl, 5-chloro-2,4-difluoro-pyrimidin-6-yl or a group of the general formula (5) having the above-indicated particularly preferred groups $Q^1$ and $Q^2$.

T in the general formula (II) is preferably hydroxyl or amino attached to the naphthalene nucleus in the a position, with hydroxyl being particularly preferred. More preferably, b is 1, v is 1 and f is 0 or 1. $R^0$ is more preferably hydrogen, acetyl, 2,4-difluoropyrimidin-6-yl, 5-chloro-2,4-difluoropyrimidin-6-yl or a group of the general formula (5) with the above-indicated particularly preferred groups $Q^1$ and $Q^2$ or is a group of the general formula (100), in which case the group X is preferably fluorine, chlorine or hydroxyl and more preferably chlorine;

d is more preferably 1.

$R^{31}$ in the formula (Ga) is preferably hydrogen, acetyl, 2,4-difluoropyrimidin-6-yl, 5-chloro-2,4-difluoropyrimidin-6-yl or a group of the general formula (5) with the above-indicated particularly preferred groups $Q^1$ und $Q^2$;

$R^{32}$ in the formula (Gb) is preferably hydrogen; $R^{33}$ and $R^{37}$ in the formulae (Gc) and (Ge) are each preferably carboxyl or methyl; preferred meanings in the formula (Gd) are $R^{34}$ methyl, $R^{35}$ cyano, carbamoyl or a group of the formula (14) and $R^{35}$ methyl or ethyl;

preferred meanings in the formula (Gf) are m 1 and n 1 or 2.

The dye mixtures of the present invention comprise bisazo dyes of the general formula (I) in an amount from 1% to 99% by weight and preferably 10% to 90% by weight and dyes of the general formula (II) and also optionally (Ga)-(Gf) independently each in an amount from 1% to 99% by weight and preferably from 10% to 90% by weight.

In addition, the dye mixtures according to the present invention may further comprise one or more monoazo dyes of the general formulae (15) and (16) in an amount of up to 10% by weight and preferably up to 5% by weight

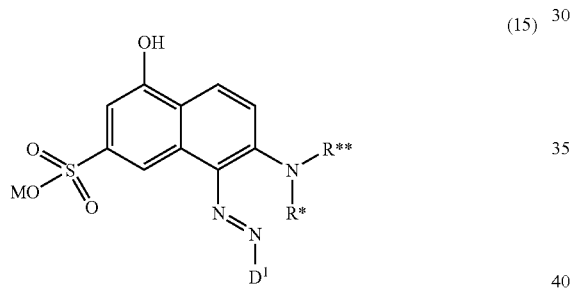
(15)

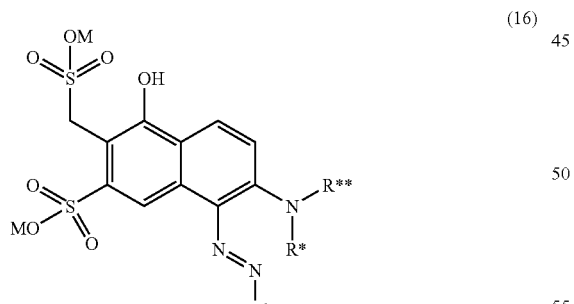
(16)

where $D^1$, M, $R^*$ and $R^{**}$ are each as defined above.

Preferably, $D^1$ is 3-(β-sulfatoethylsulfonyl)-phenyl, 4-(β-sulfatoethylsulfonyl)-phenyl, 2-sulfo-4-(β-sulfatoethylsulfonyl)-phenyl, 2-methoxy-5-(β-sulfatoethylsulfonyl)-phenyl, 2,5-dimethoxy-4-(β-sulfatoethylsulfonyl)-phenyl, 2-methoxy-5-methyl-4-(β-sulfatoethylsulfonyl)-phenyl, 3- or 4-vinylsulfonyl-phenyl, 2-sulfo-4-(vinylsulfonyl)-phenyl, 2-methoxy-5-(vinylsulfonyl)-phenyl, 2,5-dimethoxy-4-(vinylsulfonyl)-phenyl or 2-methoxy-5-methyl-4-(vinylsulfonyl)-phenyl.

Preferred dye mixtures comprise one or more, such as two or three, preferably 1 or 2 dyes of the indicated and defined general formula (I-a)

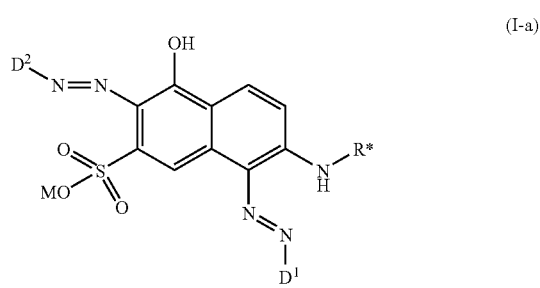
(I-a)

one or more dyes of the hereinbelow indicated and defined general formula (II-a)

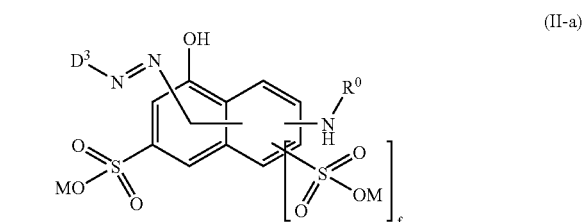
(II-a)

and/or one or more dyes of the hereinbelow indicated and defined general formula (II-b)

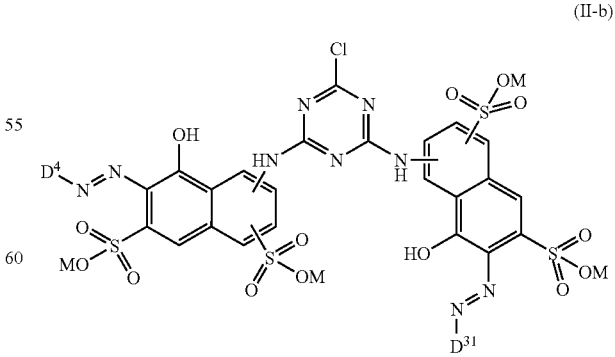
(II-b)

and optionally one or more dyes of the general formula (Ga), (Gb), (Ge) and (Gf),

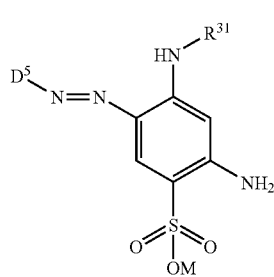
(Ga)

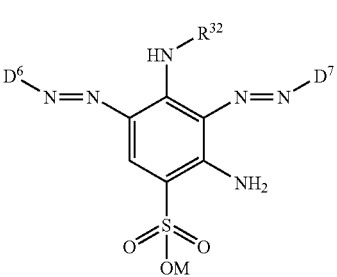
(Gb)

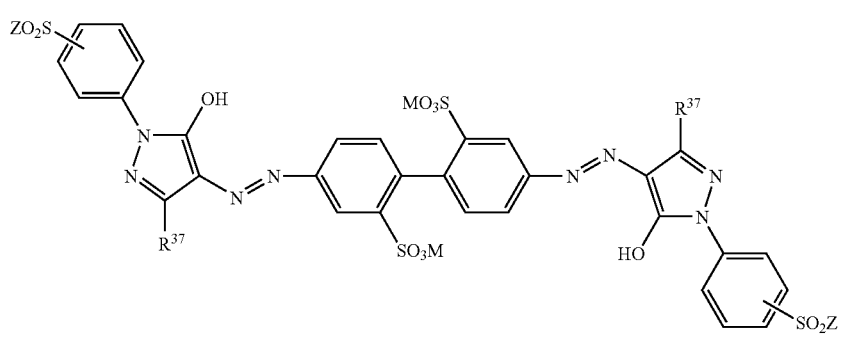
(Ge)

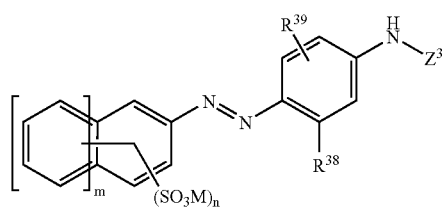
(Gf)

in each of which $D^1$ to $D^7$, $R^*$, $R^0$, f, $R^{31}$, $R^{32}$, $R^{37}$, $R^{38}$, $R^{39}$, Z, $Z^3$, m, n and M are each as defined above and $D^{31}$ has one of the meanings of $D^1$ to $D^7$.

Further preferred dye mixtures comprise at least one dye of the general formula (I-b)

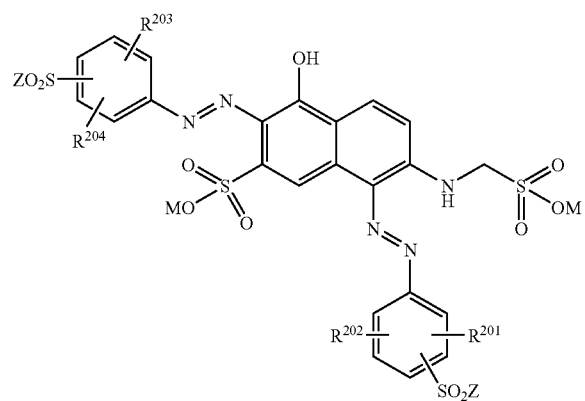
(I-b)

and at least one dye of the general formula (II-c)

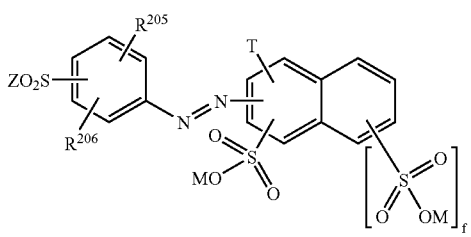
(II-c)

and optionally at least one dye of the general formulae (Ga), (Gb), (Ge) and (Gf), where $D^5$ to $D^7$, T, f, $R^{31}$, $R^{32}$, $R^{37}$, $R^{38}$, $R^{39}$, Z, $Z^3$, m, n and M are each as defined above and $R^{201}$ to $R^{206}$ are independently hydrogen, methyl, methoxy or sulfo.

Particularly preferred dye mixtures comprise one or more, such as two or three, preferably 1 or 2, dyes of the indicated and defined general formula (I-c),

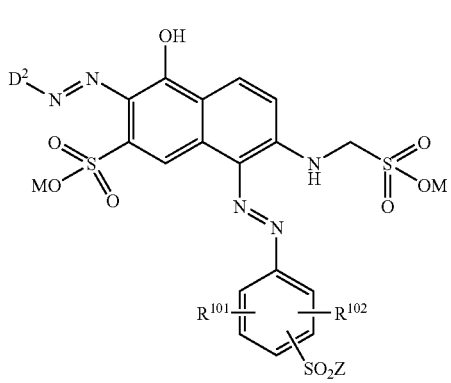

(I-c)

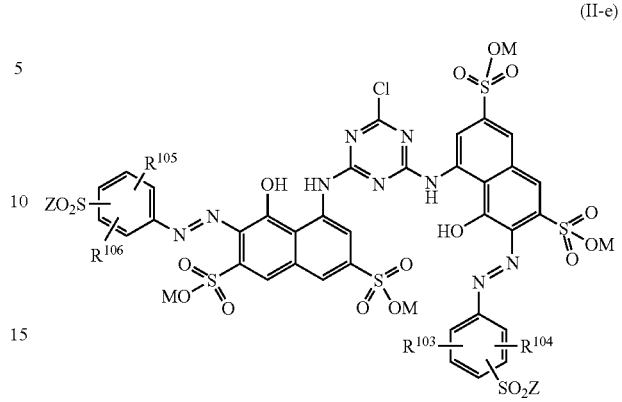

(II-e)

one or more dyes of the hereinbelow indicated and defined general formula (II-d)

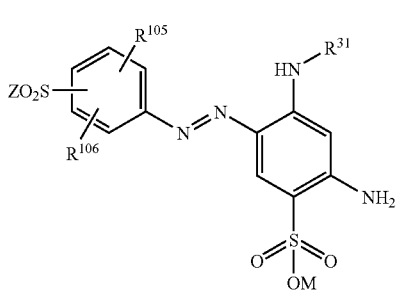

(II-d)

and/or one or more dyes of the hereinbelow indicated and defined general formula (II-e)

and optionally one or more dyes of the general formula (Ga-a), (Gb-a) and (Ge-a)

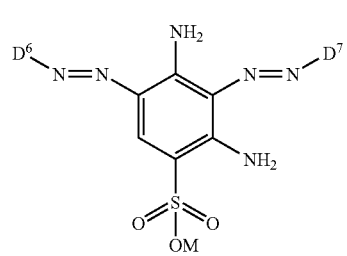

(Ga-a)

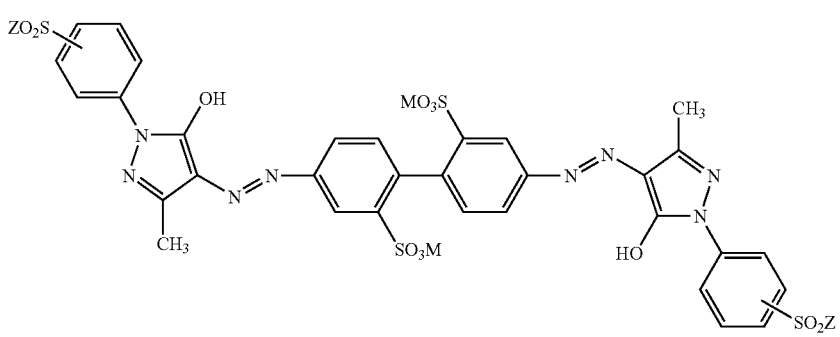

(Gb-a)

(Ge-a)

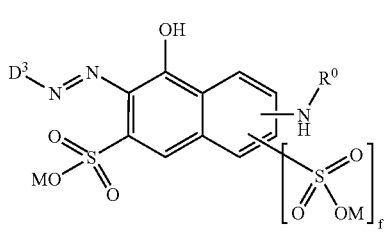

in which $D^2$, $D^3$, $D^6$, $D^7$, $R^0$, f, $R^{31}$, Z and M are each as defined above.

Preferred meanings in the general formulae (I-c), (II-e) and (Ga-a) are $R^{101}$ to $R^{108}$ independently hydrogen, $C_1$-$C_4$-alkyl, $C_1$-$C_4$-alkoxy, sulfo, carboxyl or halogen and Z vinyl or β-sulfatoethyl and very particularly preferred meanings in the formula (I-c), (II-e) and (Ga-a) are $R^{101}$ to $R^{108}$ independently hydrogen, methyl, methoxy or sulfo and Z vinyl or β-sulfatoethyl.

The dye mixtures according to the invention can be present as a preparation in solid or liquid (dissolved) form. In solid form, they contain, to the extent necessary, the electrolyte salts customary in the case of water-soluble and especially fiber-reactive dyes, such as sodium chloride, potassium chloride and sodium sulfate, and may further contain the auxiliaries customary in commercial dyes, such as buffer substances capable of setting a pH in aqueous solution between 3 and 7, for example sodium acetate, sodium citrate, sodium borate, sodium bicarbonate, sodium dihydrogenphosphate and disodium hydrogenphosphate, also dyeing auxiliaries, dustproofing agents and small amounts of siccatives; when they are present in a liquid, aqueous solution (including a content of thickeners of the type customary in print pastes), they may also contain substances which ensure a long life for these preparations, for example mold preventatives.

In solid form, the dye mixtures according to the invention are generally present as powders or granules which contain electrolyte salt and which will hereinbelow generally be referred to as a preparation with or without one or more of the abovementioned auxiliaries. In the preparations, the dye mixture is present at 20 to 90% by weight, based on the preparation containing it. The buffer substances are generally present in a total amount of up to 5% by weight, based on the preparation.

When the dye mixtures according to the invention are present in an aqueous solution, the total dye content of these aqueous solutions is up to about 50% by weight, for example between 5 and 50% by weight, the electrolyte salt content of these aqueous solutions preferably being below 10% by weight, based on the aqueous solution; the aqueous solutions (liquid preparations) can contain the aforementioned buffer substances in an amount which is generally up to 5% by weight and preferably up to 2% by weight.

Dyes of the general formula (I) are described in DE 196 00 765 A1 and dyes of the general formula (II) are described in DE 2748965 and also extensively in the literature and are obtainable via standard synthesis methods.

Dyes of the general formulae (15) and (16) are in some instances formed during the synthesis of dyes of the general formulae (I).

The dye mixtures according to the invention are preparable in a conventional manner, as by mechanically mixing the individual dyes, whether in the form of their dye powders or granules or their as-synthesized solutions or in the form of aqueous solutions of the individual dyes generally, which may additionally contain customary auxiliaries, or by conventional diazotization and coupling of suitable mixtures of diazo and coupling components in the desired amount ratios.

For example, when the diazo components having the groups $D^2$ and $D^3$ and, if appropriate, $D^4$ and optionally $D^7$ as per the general formulae (I) and (II) and, if appropriate, (100) and (Gb) have the same meaning, it is possible for an amine of the general formula (17)

 (17), where $D^2$ is as defined above, to be diazotized in a conventional manner and the diazonium compound obtained being subsequently reacted with an aqueous solution or suspension of a mixture having a fixed ratio of a monoazo dye as per the general formula (15) and of at least one coupler as per the general formula (18) and optionally of a monoazo dye as per the general formula (19)

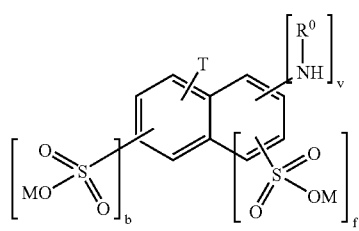 (18)

-continued

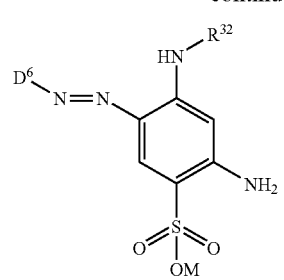 (19)

where $D^1$, $D^6$, $R^*$, $R^{**}$, $R^0$, $R^{32}$, T, b, f, v and M are each as defined above.

Alternatively, the dye mixture according to the present invention can be prepared when the groups $D^1$, $D^2$ and $D^3$ and, if appropriate, $D^4$ and optionally $D^6$, $D^7$ as per the general formulae (I) and (II) and, if appropriate, (100) and (Gb) have the same meaning, which comprises an amine of the general formula (20)

 (20), where $D^1$ is as defined above, being diazotized in a conventional manner and coupled onto a mixture of in each case at least one coupling component (21) and (18) and also optionally (22)

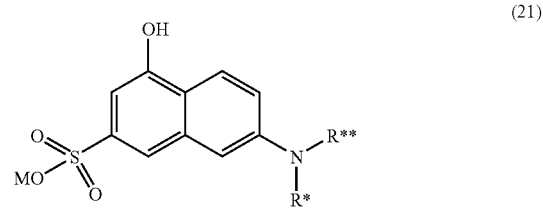 (21)

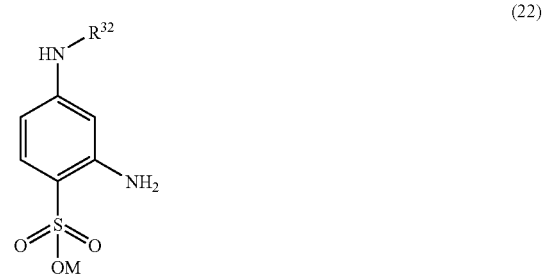 (22)

where $R^*$, $R^{**}$, $R^0$, $R^{32}$, T, b, f, v and M are each as defined above, firstly at a pH below 3 in a first stage and subsequently further coupled by an increase in pH to form a mixture of the dyes of the general formulae (I) and (II) and optionally (Gb).

The dye mixture according to the present invention is isolated in a conventional manner by salting out for example with sodium chloride or potassium chloride or by spray drying or evaporation.

Similarly, the solutions produced in the course of the synthesis of the dyes of the general formula (I) and (II) and optionally (Ga) to (Gf) can be used directly as liquid products in dyeing, if appropriate after addition of a buffer substance and if appropriate after concentrating.

Dye mixtures which as well as β-chloroethylsulfonyl or β-thiosulfatoethylsulfonyl or β-sulfatoethylsulfonyl groups also contain vinylsulfonyl groups as reactive radicals can be synthesized not only starting from appropriately substituted vinylsulfonyl-anilines or naphthylamines but also by reaction of a dye mixture where Z is β-chloroethyl, β-thiosulfatoethyl or β-sulfatoethyl with an amount of alkali required for the desired fraction and converting the β-substituted ethylsulfonyl groups mentioned into vinylsulfonyl groups. This conversion is effected in a manner familiar to one skilled in the art.

The dye mixtures according to the invention have useful application properties. They are used for dyeing or printing hydroxyl- and/or carboxamido-containing materials, for example in the form of sheetlike structures, such as paper and leather or of films, for example composed of polyamide, or in bulk, such as for example polyamide and polyurethane, but especially for dyeing and printing these materials in fiber form. Similarly, the as-synthesized solutions of the dye mixtures according to the invention can be used directly as a liquid preparation for dyeing, if appropriate after addition of a buffer substance and if appropriate after concentration or dilution.

The present invention thus also provides for the use of the dye mixtures according to the invention for dyeing or printing these materials, or rather processes for dyeing or printing these materials in a conventional manner, by using a dye mixture according to the invention or its individual components (dyes) individually together as a colorant. The materials are preferably employed in the form of fiber materials, especially in the form of textile fibers, such as woven fabrics or yarns, as in the form of hanks or wound packages.

Hydroxyl-containing materials are those of natural or synthetic origin, for example cellulose fiber materials or their regenerated products and polyvinyl alcohols. Cellulose fiber materials are preferably cotton, but also other vegetable fibers, such as linen, hemp, jute and ramie fibers; regenerated cellulose fibers are for example staple viscose and filament viscose and also chemically modified cellulose fibers, such as aminated cellulose fibers or fibers as described for example in WO 96/37641 and WO 96/37642 and also in EP-A-0 538 785 and EP-A-0 692 559.

Carboxamido-containing materials are for example synthetic and natural polyamides and polyurethanes, especially in the form of fibers, for example wool and other animal hairs, silk, leather, nylon-6,6, nylon-6, nylon-11 and nylon-4.

The dye mixtures according to the invention can be applied to and fixed on the substrates mentioned, especially the fiber materials mentioned, by the application techniques known for water-soluble dyes and especially for fiber-reactive dyes. For instance, on cellulose fibers they produce by the exhaust method from a long liquor and also from a short liquor, for example in a liquor to goods ratio of 5:1 to 100:1, preferably 6:1 to 30:1, using various acid-binding agents and optionally neutral salts as far as necessary, such as sodium chloride or sodium sulfate, dyeings having very good color yields. Application is preferably from an aqueous bath at temperatures between 40 and 105° C., optionally at a temperature of up to 130° C. under superatmospheric pressure, but preferably at 30 to 95° C., especially 45 to 65° C.; in the presence or absence of customary dyeing auxiliaries. One possible procedure here is to introduce the material into the warm bath and to gradually heat the bath to the desired dyeing temperature and complete the dyeing process at that temperature. The neutral salts which accelerate the exhaustion of the dyes may also if desired only be added to the bath after the actual dyeing temperature has been reached.

Padding processes likewise provide excellent color yields and a very good color buildup on cellulose fibers, the dyes being fixable in a conventional manner by batching at room temperature or elevated temperature, for example at up to 60° C., or in a continuous manner, for example by means of a pad-dry-pad steam process, by steaming or using dry heat.

Similarly, the customary printing processes for cellulose fibers, which can be carried out in one step, for example by printing with a print paste containing sodium bicarbonate or some other acid-binding agent and by subsequent steaming at 100 to 103° C., or in two steps, for example by printing with a neutral to weak acidic print color and then fixing either by passing the printed material through a hot electrolyte-containing alkaline bath or by overpadding with an alkaline electrolyte-containing padding liquor and subsequent batching or steaming or dry heat treatment of the alkali-overpadded material, produce strong color prints with well-defined contours and a clear white ground. The outcome of the prints is affected little, if at all, by variations in the fixing conditions.

When fixing by means of dry heat in accordance with the customary thermofix processes, hot air at 120 to 200° C. is used. In addition to the customary steam at 101 to 103° C., it is also possible to use superheated steam and high-pressure steam at temperatures of up to 160° C.

The acid-binding agents which effect the fixation of the dyes of the dye mixtures according to the invention on the cellulose fibers are for example water-soluble basic salts of alkali metals and likewise alkaline earth metals of inorganic or organic acids or compounds which liberate alkali in the heat, and also alkali metal silicates. Especially suitable are the alkali metal hydroxides and alkali metal salts of weak to medium inorganic or organic acids, the preferred alkali metal compounds being the sodium and potassium compounds. Such acid-binding agents are for example sodium hydroxide, potassium hydroxide, sodium carbonate, sodium bicarbonate, potassium carbonate, sodium formate, sodium dihydrogenphosphate, disodium hydrogenphosphate, sodium trichloroacetate, trisodium phosphate or waterglass or mixtures thereof, for example mixtures of aqueous sodium hydroxide solution and waterglass.

The present invention further relates to the use of the dye mixtures of the present invention in printing inks for digital textile printing by the inkjet process.

The printing inks of the present invention comprise the reactive dye mixtures of the present invention, for example in amounts from 0.1% by weight to 50% by weight, preferably in amounts from 1% by weight to 30% by weight and more preferably in amounts from 1% by weight to 15% by weight based on the total weight of the ink. They may also include combinations of the aforementioned reactive dye mixtures with other reactive dyes used in textile printing. For the inks to be used in the continuous flow process, a conductivity of 0.5 to 25 mS/m can be set by adding an electrolyte. Useful electrolytes include for example lithium nitrate and potassium nitrate. The dye inks of the present invention may include organic solvents at a total level of 1-50% and preferably 5-30% by weight. Suitable organic solvents are for example alcohols, for example methanol, ethanol, 1-propanol, isopropanol, 1-butanol, tert-butanol, pentyl alcohol, polyhydric alcohols for example: 1,2-ethanediol, 1,2,3-propanetriol, butanediol, 1,3-butanediol, 1,4-butanediol, 1,2-propanediol, 2,3-propanediol, pentanediol, 1,4-pentanediol, 1,5-pentanediol, hexanediol, D,L-1,2-hexanediol, 1,6-hexanediol, 1,2,6-hexanetriol, 1,2-octanediol, polyalkylene glycols, for example: polyethylene glycol, polypropylene glycol, alkylene glycols having 2 to 8 alkylene groups, for example monoethylene glycol, diethylene glycol, triethylene glycol, tetraethylene glycol, thioglycol, thiodiglycol, butyltriglycol, hexylene glycol, propylene glycol, dipropylene glycol, tripropylene glycol, low alkyl ethers of polyhydric alcohols, for example: ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol monohexyl ether, triethylene glycol monomethyl ether, triethylene glycol monobutyl ether, tripropylene glycol monomethyl ether, tetraethylene glycol monomethyl ether, tetraethylene glycol monobutyl ether, tetraethylene glycol dimethyl ether, propylene glycol monomethyl ether, propylene glycol monoethyl ether, propylene glycol monobutyl ether, tripropylene glycol isopropyl ether, polyalkylene glycol ethers, such as for example: polyethylene glycol monomethyl ether, polypropylene glycol glycerol ether, polyethylene glycol tridecyl ether, polyethylene glycol nonylphenyl ether, amines, such as, for example: methylamine, ethylamine, triethylamine, diethylamine, dimethylamine, trimethylamine, dibutylamine, diethanolamine, triethanolamine, N-acetylethanolamine, N-formylethanolamine, ethylenediamine, urea derivatives, such as for example: urea, thiourea, N-methylurea, N,N'-dimethylurea, ethyleneurea, 1,1,3,3-tetramethylurea, amides, such as for example: dimethylformamide, dimethylacetamide, acetamide, ketones or keto alcohols, such as for example: acetone, diacetone alcohol, cyclic ethers, such as for example; tetrahydrofuran, trimethylolethane, trimethylolpropane, 2-butoxyethanol, benzyl alcohol, 2-butoxyethanol, gamma butyrolactone, epsilon-caprolactam, further sulfolane, dimethylsulfolane, methylsulfolane, 2,4-dimethylsulfolane, dimethyl sulfone, butadiene sulfone, dimethyl sulfoxide, dibutyl sulfoxide, N-cyclohexylpyrrolidone, N-methyl-2-pyrrolidone, N-ethylpyrrolidone, 2-pyrrolidone, 1-(2-hydroxyethyl)-2-pyrrolidone, 1-(3-hydroxypropyl)-2-pyrrolidone, 1,3-dimethyl-2-imidazolidinone, 1,3-dimethyl-2-imidazolinone, 1,3-bismethoxymethylimidazolidine, 2-(2-methoxyethoxy)ethanol, 2-(2-ethoxyethoxy)ethanol, 2-(2-butoxyethoxy)ethanol, 2-(2-propoxyethoxy)ethanol, pyridine, piperidine, butyrolactone, trimethylpropane, 1,2-dimethoxypropane, dioxane, ethyl acetate, ethylenediaminetetraacetate, ethyl pentyl ether. The printing inks of the invention may further include customary additives, for example viscosity moderators to set viscosities in the range from 1.5 to 40.0 mPas in a temperature range from 20 to 50° C. Preferred inks have a viscosity of 1.5 to 20 mPas and particularly preferred inks have a viscosity of 1.5 to 15 mPas. Useful viscosity moderators include rheological additives, for example:

polyvinylcaprolactam, polyvinylpyrrolidone and their copolymers polyetherpolyol, associative thickeners, polyurea, polyurethane, sodium alginates, modified galactomannans, polyetherurea, polyurethane, nonionic cellulose ethers.

As further additives the inks of the invention may include surface-active substances to set surface tensions of 20 to 65 mN/m, which are adapted if necessary as a function of the process used (thermal or piezotechnology).

Useful surface-active substances include for example: all surfactants, preferably nonionic surfactants, butyldiglycol, 1,2-hexanediol. The inks may further include customary additives, for example substances to inhibit fungal and bacterial growth in amounts from 0.01 to 1% by weight based on the total weight of the ink. The inks may be prepared in a conventional manner by mixing the components in water.

The dye inks of the invention are useful in inkjet printing processes for printing a wide variety of pretreated materials, such as silk, leather, wool, polyamide fibers and polyurethanes, and especially cellulosic fiber materials of any kind. Such fiber materials are for example the natural cellulose fibers, such as cotton, linen and hemp, and also pulp and regenerated cellulose. The printing inks of the invention are also useful for printing pretreated hydroxyl- or amino-containing fibers present in blend fabrics, for example blends of cotton, silk, wool with polyester fibers or polyamide fibers.

In contrast to conventional textile printing, where the printing ink already contains all the fixing chemicals and thickeners for a reactive dye, in inkjet printing the auxiliaries have to be applied to the textile substrate in a separate pretreatment step. The pretreatment of the textile substrate, for example cellulose and regenerated cellulose fibers and also silk and wool, is effected with an aqueous alkaline liquor prior to printing. To fix reactive dyes there is a need for alkali, for example sodium carbonate, sodium bicarbonate, sodium acetate, trisodium phosphate, sodium silicate, sodium hydroxide, alkali donors such as, for example, sodium chloroacetate, sodium formate, hydrotropic substances such as, for example, urea, reduction inhibitors, for example sodium nitrobenzenesulfonates, and also thickeners to prevent flowing of the motives when the printing ink is applied, for example sodium alginates, modified polyacrylates or highly etherified galactomannans. These pretreatment reagents are uniformly applied to the textile substrate in a defined amount using suitable applicators, for example using a 2- or 3-roll pad, contactless spraying technologies, by means of foam application or using appropriately adapted inkjet technologies, and subsequently dried.

After printing, the textile fiber material is dried at 120 to 150° C. and subsequently fixed. The fixing of the inkjet prints prepared with reactive dyes may be effected at room temperature or with saturated steam, with superheated steam, with hot air, with microwaves, with infrared radiation, with laser or electron beams or with other suitable energy transfer techniques. A distinction is made between one- and two-phase fixing processes: In one-phase fixing, the necessary fixing chemicals are already on the textile substrate. In two-phase fixing, this pretreatment is unnecessary. Fixing only requires alkali, which, following inkjet printing, is applied prior to the fixing process, without intermediate drying. There is no need for further additives such as urea or thickener. Fixing is followed by the print after treatment, which is the prerequisite for good fastnesses, high brilliance and an impeccable white ground.

The dye mixtures according to the invention are notable for outstanding color strength when applied to the cellulose fiber materials by dyeing or printing in the presence of no or very small amounts of alkali or alkaline earth metal compounds. In these special cases, for instance, no electrolyte salt is required for a shallow depth of shade, not more than 5 g/l of electrolyte salt is required for a medium depth of shade and not more than 10 g/l of electrolyte salt is required for deep shades.

According to the invention, a shallow depth of shade refers to the use of 2% by weight of dye based on the substrate to be dyed, a medium depth of shade refers to the use of 2 to 4% by weight of dye based on the substrate to be dyed and a deep shade refers to the use of 4 to 10% by weight of dye based on the substrate to be dyed.

The dyeing and prints obtainable with the dye mixtures according to the invention possess bright shades; more particularly, the dyeings and prints on cellulose fiber materials possess good lightfastness and especially good wetfastnesses, such as fastness to washing, milling, water, seawater, crossdyeing and acidic and alkaline perspiration, also good fastness to pleating, hotpressing and rubbing. Furthermore, the cellulose dyeings obtained following the customary aftertreatment of rinsing to remove unfixed dye portions exhibit excellent wetfastnesses, in particular since unfixed dye portions are easily washed off because of their good solubility in cold water.

Furthermore, the dye mixtures according to the invention can also be used for the fiber-reactive dyeing of wool. Moreover, wool which has been given a nonfelting or low-felting finish (cf. for example H. Rath, Lehrbuch der Textilchemie, Springer-Verlag, 3rd edition (1972), pages 295-299, especially finished by the Hercosett process (page 298); J. Soc. Dyers and Colorists 1972, 93-99, and 1975, 33-44), can be dyed to very good fastness properties. The process of dyeing on wool is here carried out in a conventional manner from an acidic medium. For instance, acetic acid and/or ammonium sulfate or acetic acid and ammonium acetate or sodium acetate can be added to the dyebath to obtain the desired pH. To obtain a dyeing of acceptable levelness, it is advisable to add a customary leveling agent, for example a leveling agent based on a reaction product of cyanuric chloride with three times the molar amount of an aminobenzenesulfonic acid and/or of an aminonaphthalenesulfonic acid or on the basis of a reaction product of for example stearylamine with ethylene oxide. For instance, the dye mixture according to the invention is preferably subjected to the exhaust process initially from an acidic dyebath having a pH of about 3.5 to 5.5 under pH control and the pH is then, toward the end of the dyeing time, shifted into the neutral and optionally weakly alkaline range up to a pH of 8.5 to bring about, especially for very deep dyeings, the full reactive bond between the dyes of the dye mixtures according to the invention and the fiber. At the same time, the dye portion not reactively bound is removed.

The procedure described herein also applies to the production of dyeings on fiber materials composed of other natural polyamides or of synthetic polyamides and polyurethanes. In general, the material to be dyed is introduced into the bath at a temperature of about 40° C., agitated therein for some time, the dyebath is then adjusted to the desired weakly acidic, preferably weakly acetic acid, pH and the actual dyeing is carried out at a temperature between 60 and 98° C. However, the dyeings can also be carried out at the boil or in sealed dyeing apparatus at temperatures of up to 106° C. Since the water solubility of the dye mixtures according to the invention is very good, they can also be used with advantage in customary continuous dyeing processes. The color strength of the dye mixtures according to the invention is very high.

The dye mixtures according to the invention dye the materials mentioned, preferably fiber materials, in orange to red shades having very good fastness properties.

The examples hereinbelow serve to illustrate the invention. Parts and percentages are by weight, unless otherwise stated. Parts by weight relate to parts by volume as the kilogram relative to the liter. The compounds described in the examples in terms of a formula are indicated in the form of the sodium salts, since they are generally prepared and isolated in the form of their salts, preferably sodium or potassium salts, and used for dyeing in the form of their salts. The starting compounds described in the examples hereinbelow, especially the table examples, can be used in the synthesis in the form of the free acid or likewise in the form of their salts, preferably alkali metal salts, such as sodium or potassium salts.

EXAMPLE 1

30 parts of an electrolyte-containing dye powder which contains the scarlet disazo dye of formula (I-1)

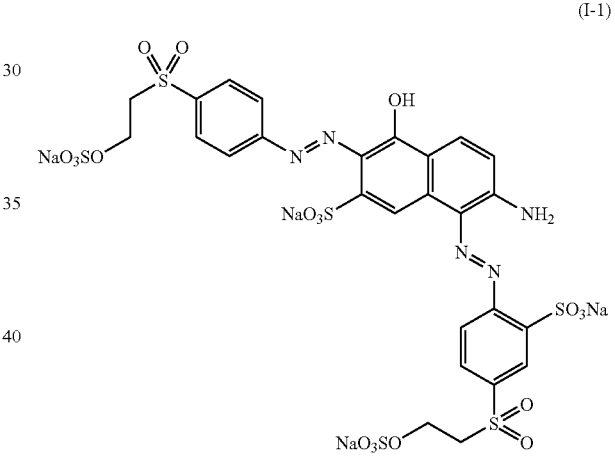

(I-1)

in a 75% fraction and 70 parts of an electrolyte-containing dye powder containing the red azo dye of the formula (II-1)

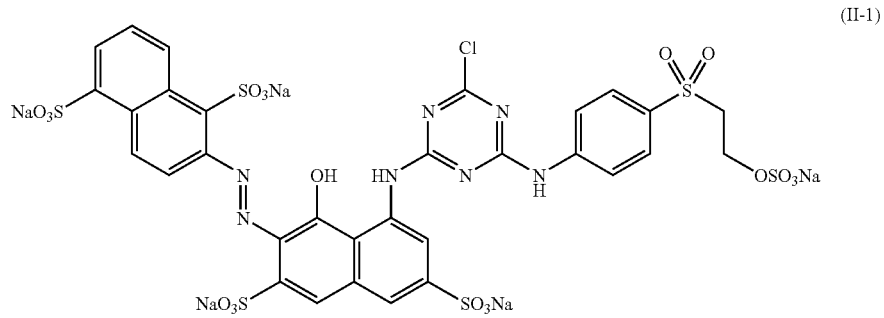

(II-1)

in a 70% fraction are mechanically mixed with each other.

The resulting dye mixture according to the present invention provides red dyeings and prints on cotton for example under the dyeing conditions customary for reactive dyes.

EXAMPLE 2

40 parts of an electrolyte-containing dye powder containing the red disazo dye of the formula (I-2)

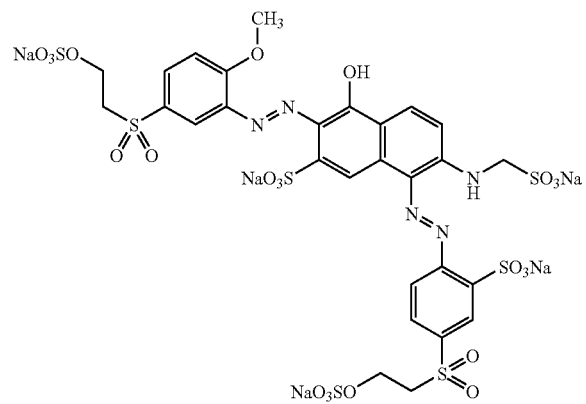

in a 75% fraction and 60 parts of an electrolyte-containing dye powder containing the red disazo dye of the formula (II-100)

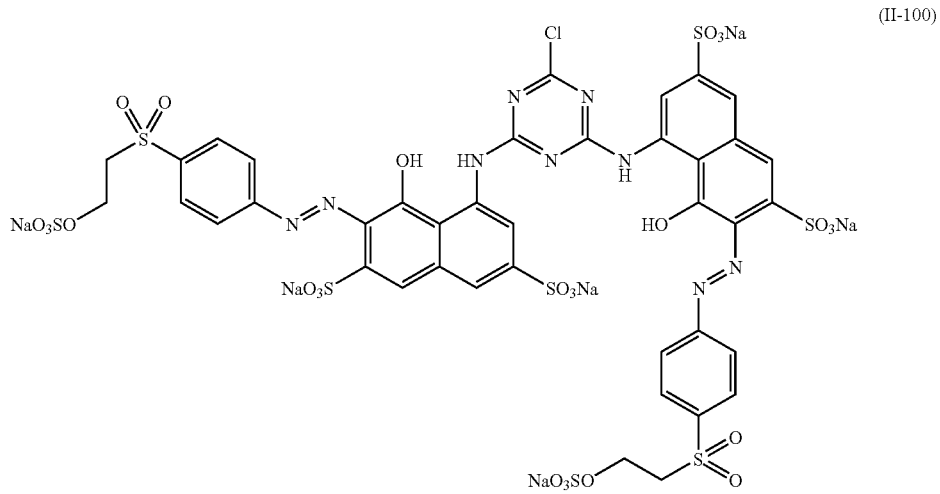

in a 70% fraction are dissolved in 500 parts of water and the resulting dye solution is adjusted to pH 5.5-6.5. Evaporating this dye solution gives a dye mixture which provides red dyeings and prints on cotton under the dyeing conditions customary for reactive dyes.

EXAMPLE 3

281 parts of 4-(β-sulfatoethylsulfonyl)aniline are suspended in 700 parts of ice-water and 180 parts of 30% hydrochloric acid and diazotized by dropwise addition of 173 parts of 40% sodium nitrite solution. After excess nitrite had been removed with sulfamic acid solution, the diazo suspension obtained is pumped into an aqueous solution of 397 parts of the scarlet monoazo dye of the formula (15-1)

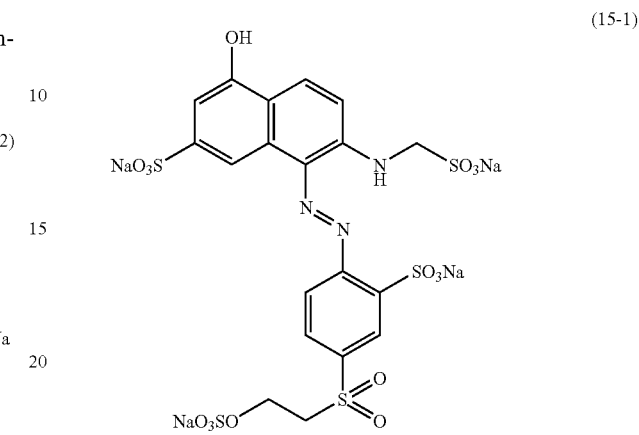

which was obtained by diazotization of 180.5 parts of 2-amino-5-(β-sulfatoethyl-sulfonyl)benzenesulfonic acid with 87 parts of 40% sodium nitrite solution in an acidic medium and subsequent coupling onto 166.5 parts of 4-hydroxy-7-(sulfomethylamino)naphthalene-2-sulfonic acid at pH 1.5. 140.5 parts of 7-acetylamino-4-hydroxynaphthalene-2-sulfonic acid are subsequently added as a second coupling component and pH 5-6 is set at below 25° C. and maintained with sodium carbonate.

The 65:35 mixture of the two dyes (I-3) and (II-2) which is formed after the coupling reaction has ended can be isolated by evaporation under reduced pressure or by spray drying; alternatively, the dye solution obtained can also be buffered at pH 5.5-6 by addition of a phosphate buffer and be further diluted or concentrated to provide a liquid brand of defined strength.

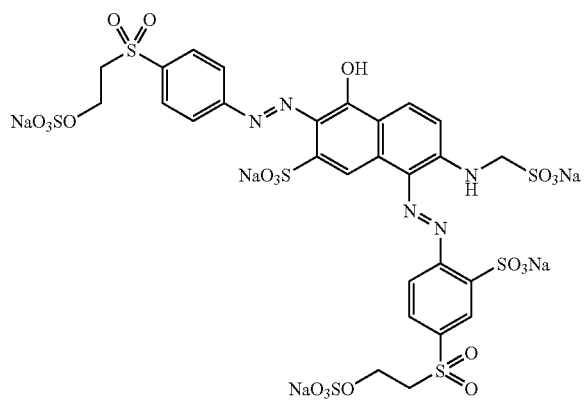

(I-3)

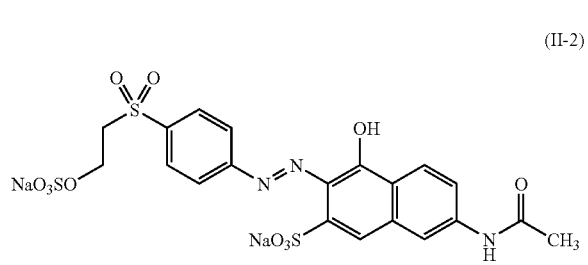

(II-2)

The dye mixture obtained according to the present invention dyes cotton in reddish orange shades.

EXAMPLE 4

422 parts of 4-(β-sulfatoethylsulfonyl)aniline are suspended in 1000 parts of ice-water and 270 parts of 30% hydrochloric acid and diazotized by dropwise addition of 260 parts of 40% sodium nitrite solution. After excess nitrite has been removed with sulfamic acid solution, the diazo suspension obtained is admixed with an aqueous solution of 166.5 parts of 4-hydroxy-7-(sulfomethylamino)naphthalene-2-sulfonic acid (obtained by reaction of 119.5 parts of 7-amino-4-hydroxynaphthalene-2-sulfonic acid with 75 parts of formaldehyde sodium bisulfite in an aqueous medium at pH 5.5-6 and 45° C.) and adjusted to pH 1.5 with solid sodium bicarbonate. After the acidic coupling has ended, this reaction mixture has added to it an aqueous solution of 335 parts of the second coupling component (18-1) and is adjusted to and maintained at pH 5-6 with sodium carbonate below 25° C.

(18-1)

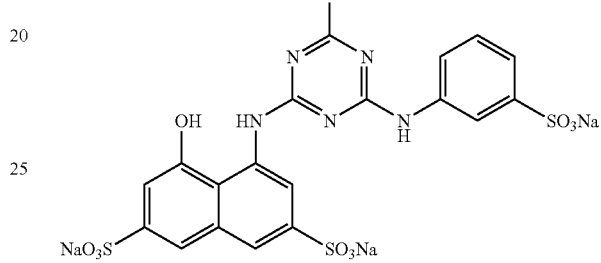

The 50:50 mixture of the two dyes (I-4) and (II-3) which has formed after the coupling reaction has ended can be isolated by evaporation under reduced pressure or by spray drying.

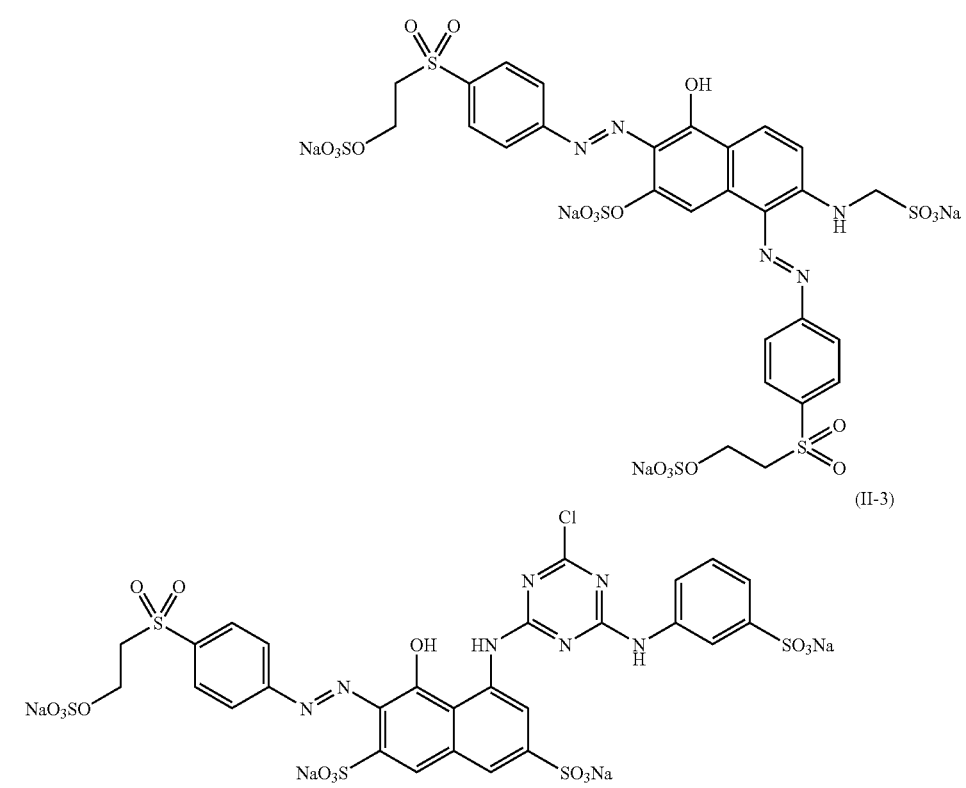

The resulting dye mixture according to the present invention dyes cotton in red shades.

EXAMPLE 5

A binary mixture prepared similarly to the procedure described in example 3 from 554 parts of the scarlet disazo dye of the formula (I-3) and 277 parts of the red dye of the formula (II-4) is admixed with 277 parts of the red disazo dye of the formula (II-100), adjusted to a pH of 5.5-6.5 and isolated by evaporation of the aqueous solution. The resulting 50:25:25 mixture of the three dyes (I-3), (II-4) and (II-100) which is according to the present invention dyes cotton in red shades.

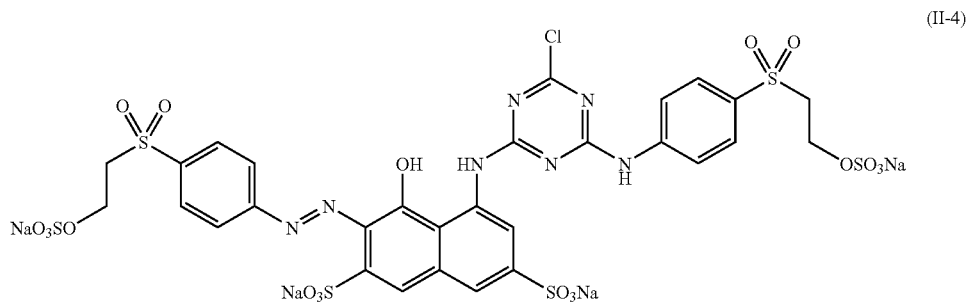

(II-4)

EXAMPLE 6

25 parts of an electrolyte-containing dye powder containing the red disazo dye of the formula (I-5)

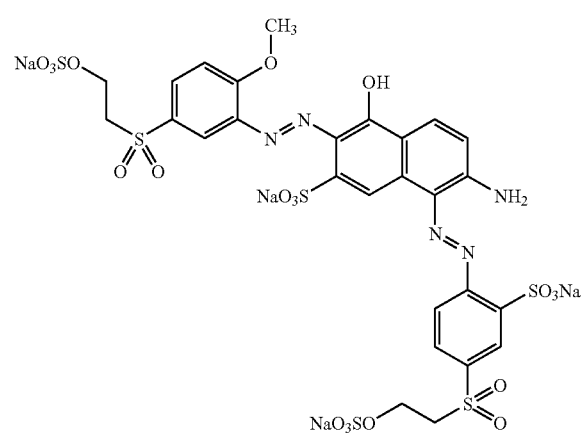

(I-5)

in a 75% fraction and 75 parts of an electrolyte-containing 1:1 dye mixture containing the two red azo dyes of the formulae (II-3) and (II-4) in a 70% fraction are mechanically mixed with each other.

The resulting dye mixture according to the present invention provides red dyeings and prints on cotton for example under the dyeing conditions customary for reactive dyes.

EXAMPLE 7 a) 312 parts of 2-(β-sulfatoethylsulfonyl)aniline are suspended in 800 parts of ice-water by addition of 165 parts of concentrated sulfuric acid and diazotized by dropwise addition of 195 parts of 40% sodium nitrite solution. After excess nitrite has been removed with sulfamic acid, a mixture of 250 parts of 4-hydroxy-7-(sulfomethyl-amino)naphthalene-2-sulfonic acid and 120 parts of 4-hydroxy-6-(sulfomethyl-amino)naphthalene-2-sulfonic acid (prepared by reaction of 179 parts of 7-amino-4-hydroxynaphthalene-2-sulfonic acid and 86 parts of 6-amino-4-hydroxy-naphthalene-2-sulfonic acid with 171 parts of formaldehyde sodium bisulfite in an aqueous medium at pH 5.5-6 and 45° C.) is added and coupled in a first stage at pH 1 to 2 below 20° C. to form a mixture of two monoazo dyes as per the formulae (15-2) and (II-5). The stated pH range is set (and maintained during the coupling reaction) by addition of solid sodium bicarbonate.

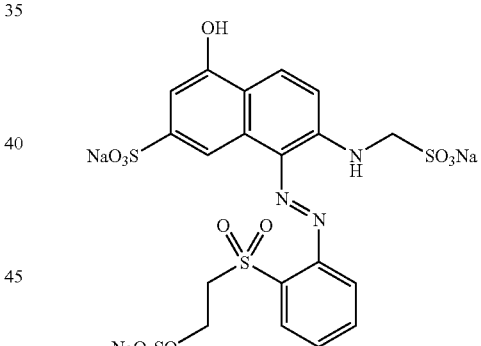

(15-2)

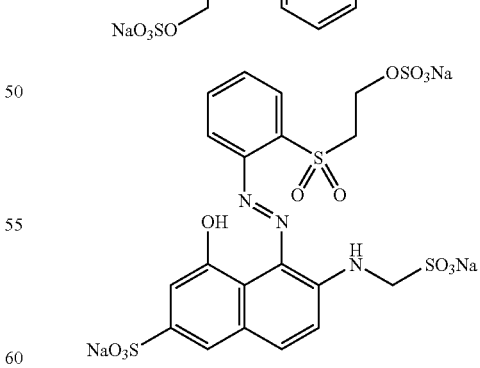

(II-5)

b) Separately, 211 parts of 4-(β-sulfatoethylsulfonyl) aniline are suspended in 520 parts of ice-water and 137 parts of 30% hydrochloric acid and diazotized by dropwise addition of 132 parts of 40% sodium nitrite solution. After excess nitrite has been removed with sulfamic acid, this diazo suspension is added dropwise to the mixture of the first coupling stage from a) and pH 5.5-6.5 is set at below 25° C. with sodium carbonate. The 3:1 mixture of the two azo dyes (I-6) and (II-5) which has formed after the second coupling reaction has ended is subsequently isolated by spray drying.

The resulting dye mixture according to the present invention dyes cotton in brownish red shades.

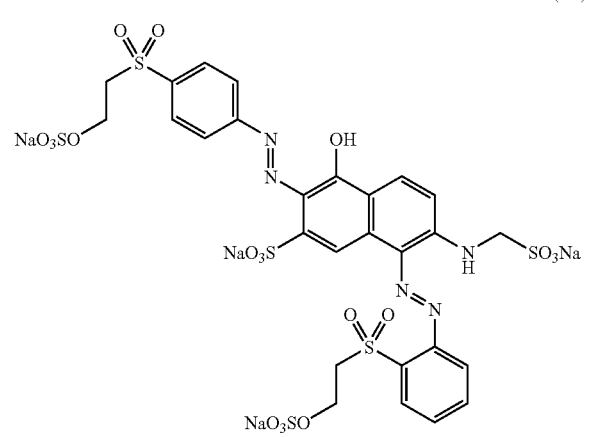

(I-6)

EXAMPLE 8

25 parts of an electrolyte-containing dye powder containing the brownish red disazo dye in the formula (I-7)

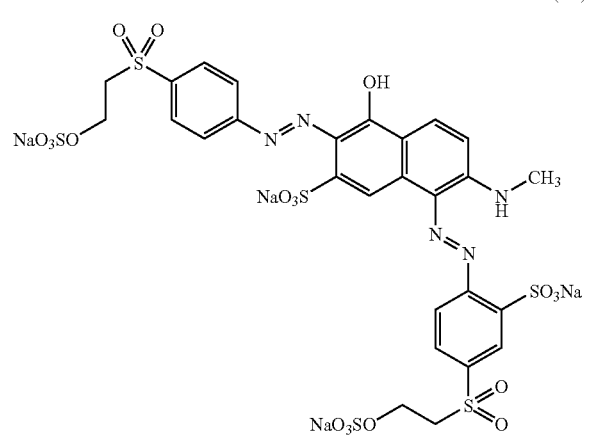

(I-7)

in a 75% fraction, 35 parts of an electrolyte-containing dye powder containing the red disazo dye of the formula (II-1) again in a 75% fraction and 40 parts of an electrolyte-containing dye powder containing the red disazo dye of the formula (II-3) in a 70% fraction are dissolved in 500 parts of water and the dye solution obtained is adjusted to pH 5.5-6.5. Evaporation or spray drying of this dye solution provides a dye mixture which provides red to reddish brown dyeings and prints on cotton under the dyeing conditions customary for reactive dyes.

EXAMPLE 9

326 parts of 4-(β-sulfatoethylsulfonyl)aniline are suspended in 800 parts of ice-water and 212 parts of 30% hydrochloric acid and diazotized by dropwise addition of 204 parts of 40% sodium nitrite solution. After excess nitrite has been removed with sulfamic acid, this diazo suspension is added dropwise to an aqueous solution of 397 parts of the scarlet monoazo dye of the formula (15-1) (prepared as described in example 3), 147 parts of 4-aminonaphthalene-1-sulfonic acid are added as a second coupling component, and a pH of 5.5-6.5 is set with sodium carbonate at below 25° C. The 60:40 mixture of the two azo dyes (I-3) and (II-6) which has formed after the coupling reaction has ended is subsequently isolated by spray drying.

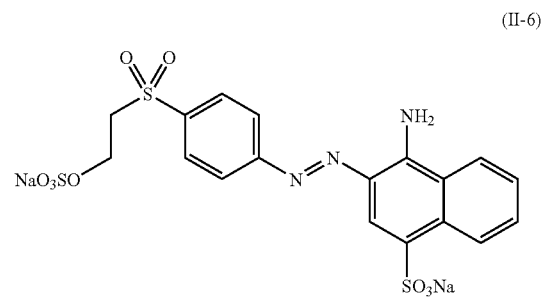

(II-6)

The resulting dye mixture according to the present invention dyes cotton in reddish orange shades.

EXAMPLE 10

333 parts of 4-(β-sulfatoethylsulfonyl)aniline are suspended in 850 parts of ice-water and 214 parts of 30% hydrochloric acid and diazotized by dropwise addition of 205 parts of 40% sodium nitrite solution. After excess nitrite has been removed with sulfamic acid solution, the diazo suspension obtained is pumped into an aqueous solution of 339 parts of the scarlet monoazo dye of the formula (15-3)

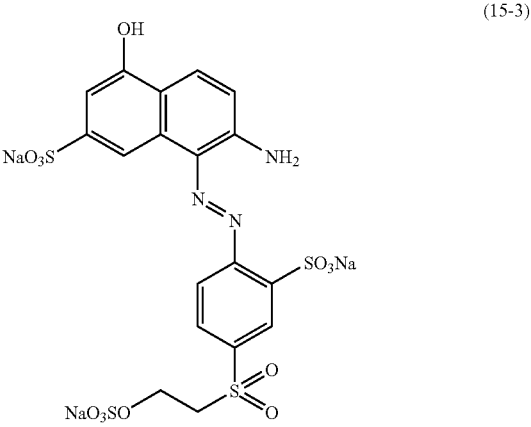

(15-3)

which was obtained by diazotization of 180.5 parts of 2-amino-5-(β-sulfatoethyl-sulfonyl)benzenesulfonic acid with 87 parts of 40% sodium nitrite solution in an acidic medium and subsequent coupling onto 119 parts of 7-amino-4-hydroxy-naphthalene-2-sulfonic acid at pH 1.5 to 2. This is followed by the addition of 140 parts each of the two further coupling components (18-2) and (18-3)

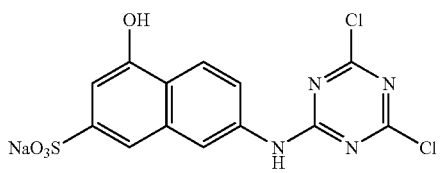

(18-2)

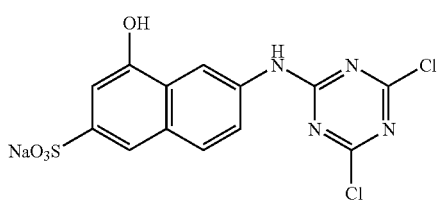

(18-3)

and pH 5-6 is set and maintained with sodium carbonate below 25° C. The 50:25:25 mixture of the three dyes (I-1), (II-7) and (II-8) which has formed after the coupling reaction has ended can be isolated by evaporation under reduced pressure or by spray drying.

(II-7)

(II-8)

The resulting dye mixture of the present invention dyes cotton in reddish orange shades.

EXAMPLE 11

281 parts of 4-(β-sulfatoethylsulfonyl)aniline are suspended in 700 parts of ice-water and 180 parts of 30% hydrochloric acid and diazotized by dropwise addition of 173 parts of 40% sodium nitrite solution. After excess nitrite has been removed with sulfamic acid solution, the diazo suspension obtained is admixed with an aqueous solution of 83 parts of 4-hydroxy-7-(sulfomethylamino)naphthalene-2-sulfonic acid (obtained by reaction of 60 parts of 7-amino-4-hydroxynaphthalene-2-sulfonic acid with 37.5 parts of formaldehyde sodium bisulfite in an aqueous medium at pH 5.5-6 and 45° C.) and adjusted to pH 1.5 with solid sodium bicarbonate. After the acidic coupling has ended, this reaction mixture has added to it an aqueous solution of 111 parts of 4-aminophthalene-1-sulfonic acid as the second coupling component and is adjusted to and maintained at pH 5-6 with sodium carbonate below 25° C. After the coupling reaction has ended, the reaction mixture is admixed with 73 parts of the golden yellow azo dye of the formula (Ga-1) and the resulting 42:46:12 mixture of the three azo dyes (I-4), (II-6) and (Ga-1) is isolated by spray drying.

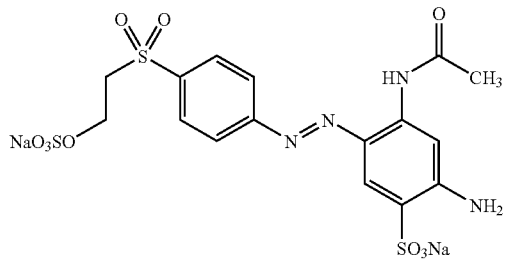

(Ga-1)

The resulting dye mixture according to the present invention provides orange dyeings and prints on cotton for example under the dyeing conditions customary for reactive dyes.

EXAMPLE 12

281 parts of 4-(β-sulfatoethylsulfonyl)aniline are suspended in 700 parts of ice-water and 180 parts of 30% hydrochloric acid and diazotized by dropwise addition of 173 parts of 40% sodium nitrite solution. After excess nitrite has been removed with sulfamic acid solution, the diazo suspension obtained is added to an aqueous solution of 397 parts of the scarlet monoazo dye of the formula (15-1), which was obtained by diazotization of 180.5 parts of 2-amino-5-(β-sulfatoethylsulfonyl)-benzenesulfonic acid with 87 parts of 40% sodium nitrite solution in an acidic medium and subsequent coupling onto 166.5 parts of 4-hydroxy-7-(sulfomethylamino)-naphthalene-2-sulfonic acid at pH 1.5. This is followed by the addition of 258 parts of the further coupling component (18-4)

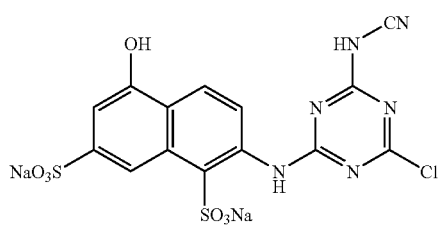

(18-4)

in the form of an aqueous solution and pH 5-6 is set and maintained with sodium carbonate below 25° C.

After the coupling reaction has ended, the reaction mixture is admixed with 242 parts of the golden yellow azo dye of the formula (Ga-3) and the resulting 46:34:20 mixture of the three azo dyes (I-3), (II-9) and (Ga-3) is isolated by evaporation under reduced pressure or spray drying. Alternatively, the dye solution obtained can also be buffered at pH 5.5-6 by addition of a phosphate buffer and further diluted or concentrated to provide a liquid brand of defined strength.

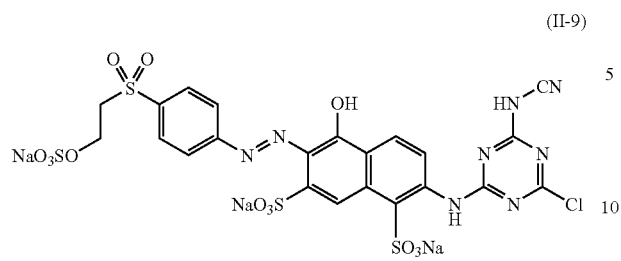

(II-9)

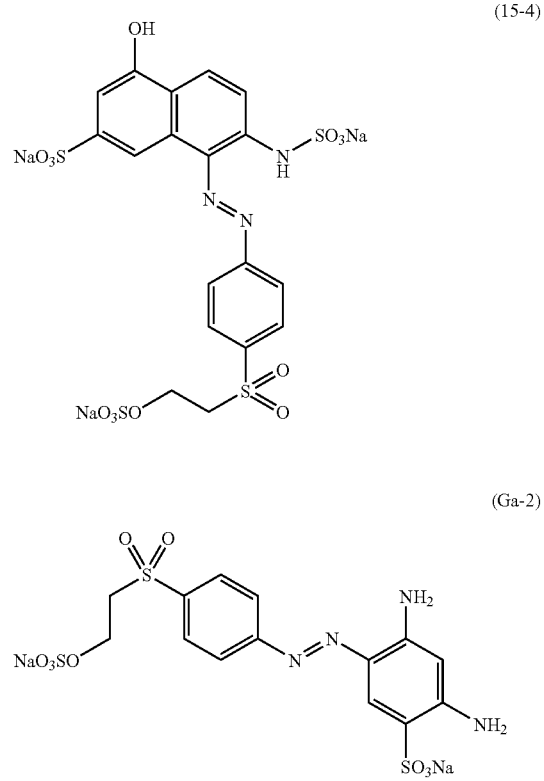

(15-4)

(Ga-2)

(Ga-3)

The resulting dye mixture according to the present invention dyes cotton in orange shades.

EXAMPLE 13

200 parts of 4-(β-sulfatoethylsulfonyl)aniline are suspended in 500 parts of ice-water and 129 parts of 30% hydrochloric acid and diazotized by dropwise addition of 125 parts of 40% sodium nitrite solution. After excess nitrite has been removed with sulfamic acid, 67 parts of 4-hydroxy-7-(sulfomethylamino)naphthalene-2-sulfonic acid (prepared by reaction of 48 parts of 7-amino-4-hydroxynaphthalene-2-sulfonic acid with 32 parts of formaldehyde sodium bisulfite in an aqueous medium at pH 5.5-6 and 45° C.) and also 23 parts of 2,4-diaminobenzenesulfonic acid are added and initially coupled in a first stage at pH 1 to 2 below 20° C. to form a mixture of two monoazo dyes as per the formulae (15-4) and (Ga-2). The stated pH range is set and maintained during the coupling reaction by addition of solid sodium bicarbonate.

After the first coupling has ended, 27 parts of the further coupling component (18-5)

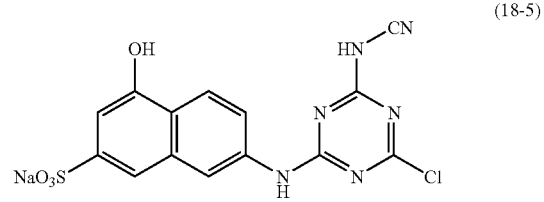

(18-5)

are added and pH 5.5-6.5 is subsequently set with sodium carbonate below 25° C. The 58:13:29 mixture of the three azo dyes (I-4), (II-10) and (Gb-1) which has formed after the second coupling reaction has ended is isolated by spray drying.

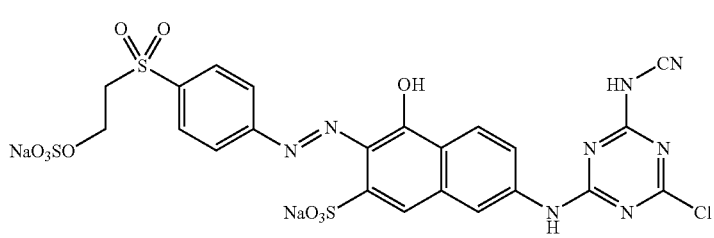

(II-10)

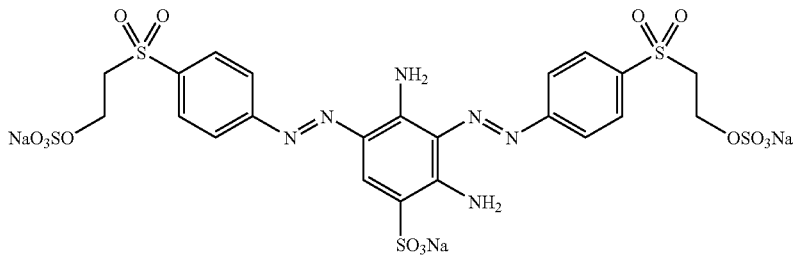
(Gb-1)

The resulting dye mixture according to the present invention dyes cotton in orange shades.

EXAMPLE 14

169 parts of 4-(β-sulfatoethylsulfonyl)aniline are suspended in 430 parts of ice-water and 109 parts of 30% hydrochloric acid and diazotized by dropwise addition of 105 parts of 40% sodium nitrite solution. After excess nitrite has been removed with sulfamic acid solution, the diazo suspension obtained is pumped into an aqueous solution of a mixture of 159 parts of the scarlet monoazo dye of the formula (15-1) and 188 parts of the yellow monoazo dye of the formula (Ga-4)

which was formed by diazotization of 180.5 parts of 2-amino-5-(β-sulfatoethyl-sulfonyl)benzenesulfonic acid with 87 parts of 40% sodium nitrite solution in a sulfuric acid medium and subsequent coupling onto a mixture of 66.5 parts of 4-hydroxy-7-(sulfomethylamino)naphthalene-2-sulfonic acid and 56.5 parts of 2,4-diaminobenzenesulfonic acid at pH 1.5 to 2. This is followed by the addition of 22.5 parts of 4-aminonaphthalene-1-sulfonic acid as a further coupling component and pH 5-6 is set and maintained with sodium carbonate. The 40:10:50 mixture of the three dyes (I-3), (II-6) and (Gb-2) which has formed after the coupling reaction has ended can be isolated by evaporation under reduced pressure or by spray drying. Alternatively, the dye solution obtained can be buffered at pH 5.5-6 by addition of a phosphate buffer and further diluted or concentrated to provide a liquid brand of defined strength.

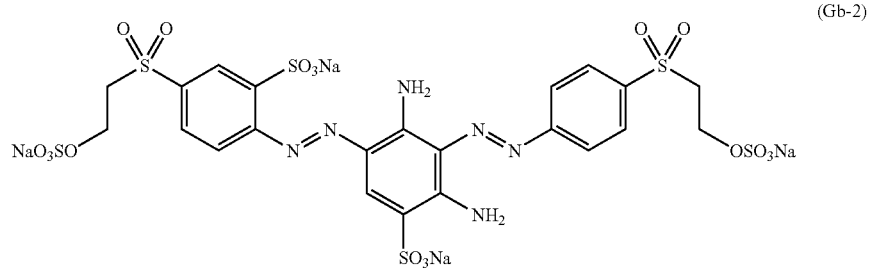
(Gb-2)

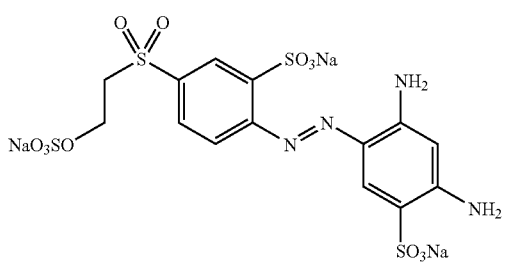
(Ga-4)

The resulting dye mixture according to the present invention dyes cotton in orange to reddish orange shades.

EXAMPLES 15 to 163

The table examples which follow describe further inventive mixtures of the dyes of the general formulae (I) and (II) and if appropriate (Ga)-(Gf), which are each listed in the form of the sodium salts. The mixing ratios are reported in percent by weight. The dye mixtures provide orange/scarlet to brownish red dyeings on cotton for example by the dyeing methods customary for reactive dyes.

Dye mixtures as per example 1 or 2

| Example | General formula (I) dye | General formula (II) dye | (I):(II) ratio |
|---|---|---|---|
| 15 | (I-1) | (II-4) | 30:70 |
| 16 | (I-2) | 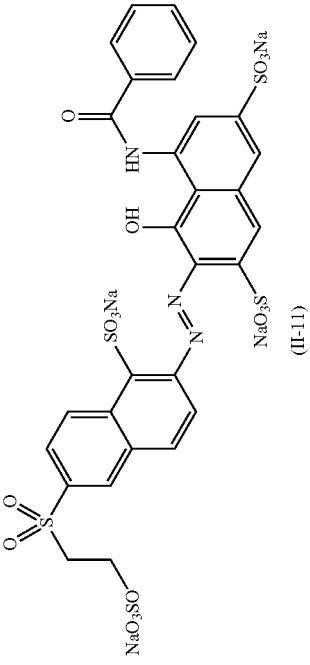 (II-11) | 75:25 |
| 17 | (I-3) | (II-7) | 60:40 |
| 18 | (I-4) | 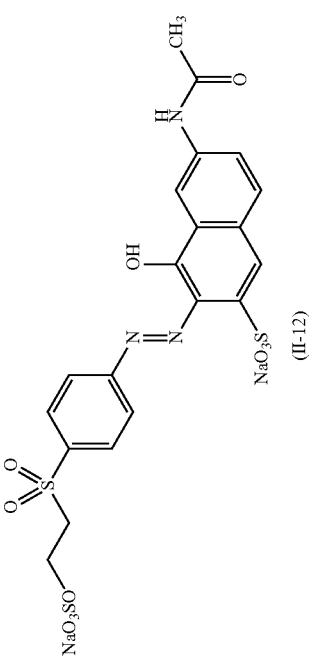 (II-3) | 50:50 |
| 19 | (I-5) | (II-12) | 25:75 |

-continued

| Example | General formula (I) dye | General formula (II) dye | (I):(II) ratio |
|---|---|---|---|
| 20 | (I-6) | (II-13) | 67:33 |
| 21 | (I-7) | (II-1) | 10:90 |
| 22 | (I-8) | | 45:55 |

-continued

| Example | General formula (I) dye | General formula (II) dye | (I):(II) ratio |
|---|---|---|---|
| 23 | (I-9) | (II-8) | 40:60 |
| 24 | (I-10) | (II-101) | 30:70 |

-continued

| Example | General formula (I) dye | General formula (II) dye | (I):(II) ratio |
|---|---|---|---|
| 25 | (I-11) | (II-100) | 8:92 |
| 26 | (I-12) | (II-15) | 70:30 |

| Example | General formula (I) dye | General formula (II) dye | (I):(II) ratio |
|---|---|---|---|
| 27 | (I-13) | (II-16) | 65:35 |
| 28 | (I-13), (I-14) | | 62:38 |

| Example | General formula (I) dye | General formula (II) dye | (I):(II) ratio |
|---|---|---|---|
| 29 | (I-15) 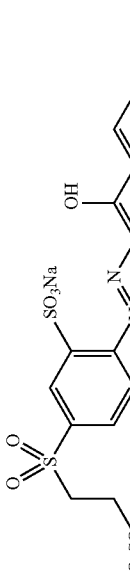 | (II-2) | 50:50 |
| 30 | (I-16) 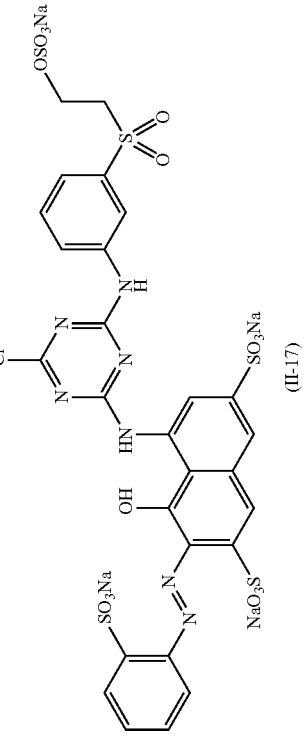 | (II-17)  | 60:40 |

-continued

| Example | General formula (I) dye | General formula (II) dye | (I):(II) ratio |
|---------|-------------------------|--------------------------|----------------|
| 31 | (I-17) | (II-12) | 25:75 |
| 32 | (I-18) | (II-11) | 15:85 |

-continued
| Example | General formula (I) dye | General formula (II) dye | (I):(II) ratio |
|---|---|---|---|
| 33 | 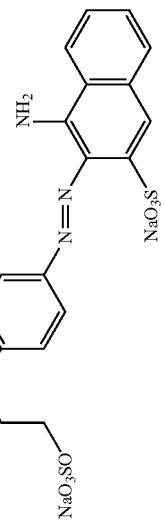 (I-19) | 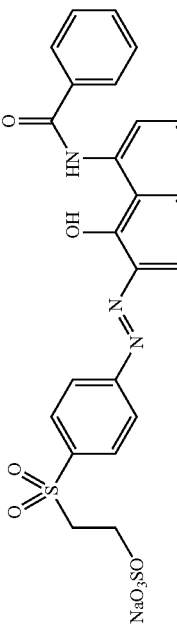 (II-18) | 40:60 |
| 34 | 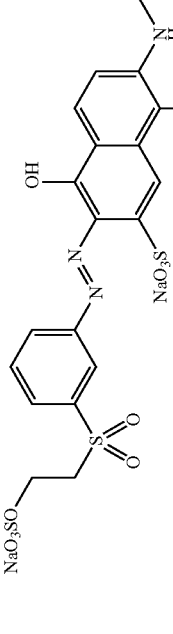 (I-20) |  (II-19) | 85:15 |

-continued

| Example | General formula (I) dye | General formula (II) dye | (I):(II) ratio |
|---|---|---|---|
| 35 | (I-21) | (II-6) | 60:40 |
| 36 | (I-22) | (II-5) | 12:88 |

| Example | General formula (I) dye | General formula (II) dye | (I):(II) ratio |
|---|---|---|---|
| 37 | (I-23) | (II-20) | 40:60 |
| 38 | (I-24) | (II-102) | 45:55 |

| Example | General formula (I) dye | General formula (II) dye | (I):(II) ratio |
|---|---|---|---|
| 39 | (I-12) | (II-15) | 80:20 |
| 40 | (I-26) | (II-22) | 50:50 |
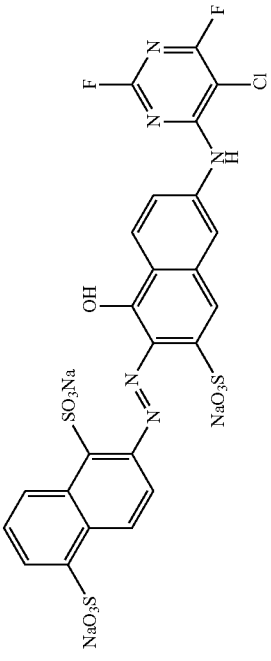

-continued

| Example | General formula (I) dye | General formula (II) dye | (I):(II) ratio |
|---------|-------------------------|--------------------------|----------------|
| 41 | (I-27) | (II-16) | 70:30 |
| 42 | (I-28) | (II-14) | 5:95 |

-continued

| Example | General formula (I) dye | General formula (II) dye | (I):(II) ratio |
|---|---|---|---|
| 43 | (I-29) | (II-9) | 20:80 |
| 44 | (I-30) | (I-3) | 25:75 |

| Example | General formula (I) dye | General formula (II) dye | (I):(II) ratio |
|---|---|---|---|
| 45 | (I-31) | (II-22) | 55:45 |
| 46 | (I-32) | (II-20) | 30:70 |

| Example | General formula (I) dye | General formula (II) dye | (I):(II) ratio |
|---|---|---|---|
| 47 | (I-33) 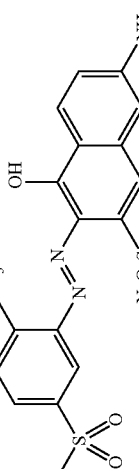 | (II-15) | 35:65 |
| 48 | (I-34) 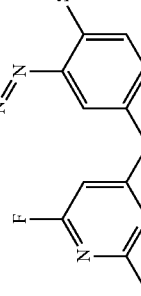 | (II-23) 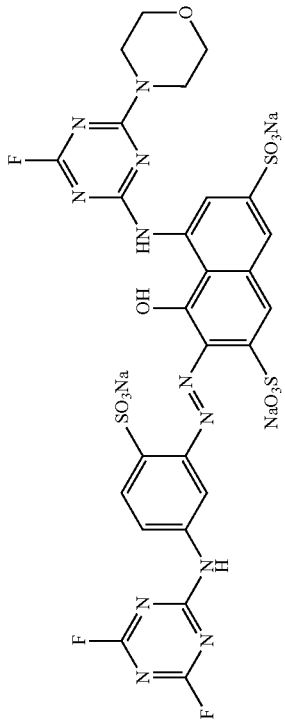 | 65:35 |

-continued

| Example | General formula (I) dye | General formula (II) dye | (I):(II) ratio |
|---|---|---|---|
| 49 | (I-35) | (II-100) | 20:80 |
| 50 | (I-36) | (II-24) | 15:85 |

-continued

| Example | General formula (I) dye | General formula (II) dye | (I):(II) ratio |
|---|---|---|---|
| 51 | (I-37) | (II-7) | 55:45 |
| 52 | (I-38) | (II-25) | 75:25 |

-continued

| Example | General formula (I) dye | General formula (II) dye | (I):(II) ratio |
|---|---|---|---|
| 53 | (I-39) | (II-26) | 30:70 |
| 54 | (I-40) | (II-27) | 35:65 |

| Example | General formula (I) dye | General formula (II) dye | (I):(II) ratio |
|---|---|---|---|
| 55 | (I-41) 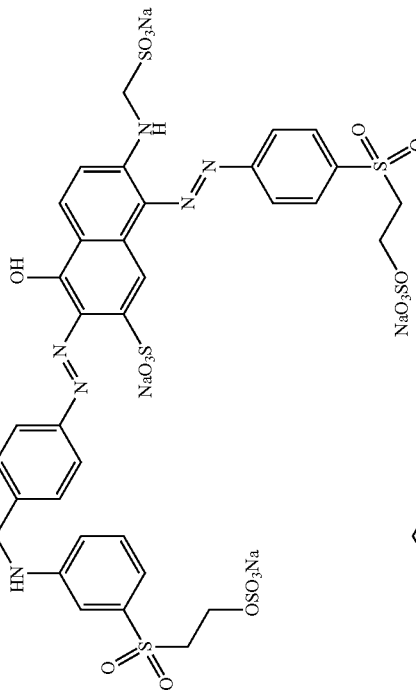 | (II-10) 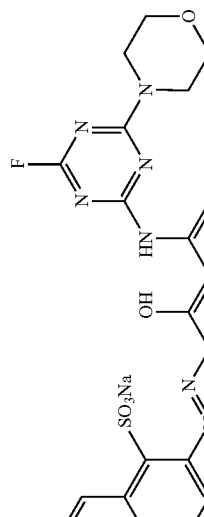 | 40:60 |
| 56 | (I-42) 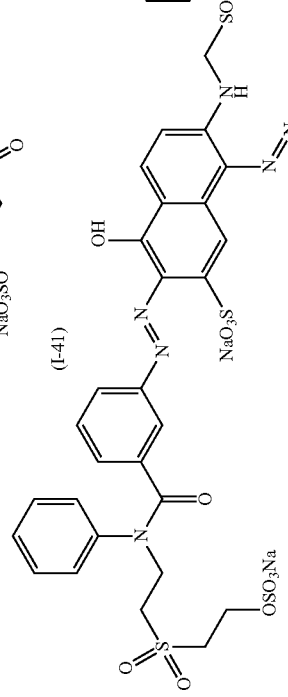 | (II-28) 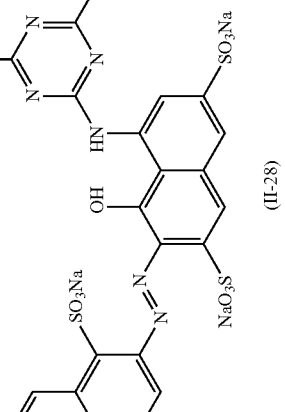 | 20:80 |

-continued

| Example | General formula (I) dye | General formula (II) dye | (I):(II) ratio |
|---|---|---|---|
| 57 | (I-43) | (II-26) | 30:70 |
| 58 | (I-44) | (II-29) | 70:30 |

-continued

| Example | General formula (I) dye | General formula (II) dye | (I):(II) ratio |
|---|---|---|---|
| 59 | (I-45) | (II-30) | 55:45 |
| 60 | (I-46) | (II-24) | 30:70 |

-continued

| Example | General formula (I) dye | General formula (II) dye | (I):(II) ratio |
|---|---|---|---|
| 61 | (I-47) | (II-31) | 60:40 |
| 62 | (I-48) | (II-32) | 40:60 |

-continued

| Example | General formula (I) dye | General formula (II) dye | (I):(II) ratio |
|---|---|---|---|
| 63 | (I-49) | (II-33) | 30:70 |
| 64 | (I-2) | (II-1) | 25:75 |
| 65 | (I-2) | (II-3) | 20:80 |
| 66 | (I-2) | (II-4) | 30:70 |
| 67 | (I-3) | (II-1) | 20:80 |
| 68 | (I-3) | (II-3) | 25:75 |
| 69 | (I-3) | (II-4) | 15:85 |
| 70 | (I-3) | (II-100) | 25:75 |
| 71 | (I-5) | (II-1) | 20:80 |
| 72 | (I-5) | (II-4) | 30:70 |
| 73 | (I-5) | (II-100) | 33:67 |
| 74 | (I-7) | (II-3) | 15:85 |
| 75 | (I-7) | (II-4) | 20:80 |
| 76 | (I-7) | (II-100) | 22:78 |

Structures shown:
- General formula (I) dye example: (I-49)
- General formula (II) dye example: (II-33)

Dye Mixtures as per Example 3, 4 or 9

| Example | General formula (I) dye | General formula (II) dye | (I):(II) ratio |
|---|---|---|---|
| 77 | (I-1) | (II-22) | 70:30 |
| 78 | (I-2) | (II-24) | 50:50 |
| 79 | (I-3) | (II-9) | 65:35 |
| 80 | (I-4) | (II-4) | 30:70 |
| 81 | (I-5) | (II-24) | 20:80 |
| 82 | (I-6) | (II-2) | 60:40 |
| 83 | (I-7) | (II-22) | 25:75 |
| 84 | (I-9) | (II-13) | 20:80 |
| 85 | (I-26) | (II-31) | 40:60 |
| 86 | (I-36) | (II-11) | 45:55 |
| 87 | (I-39) | (II-32) | 50:50 |
| 88 | (I-41) | (II-27) | 60:40 |
| 89 | (I-45) | (II-7) | 70:30 |
| 90 | (I-47) | (II-23) | 35:65 |

Dye Mixtures as per Example 6 or 8

| Example | General formula (I) dye | 1st General formula (II) dye | 2nd General formula (II) dye | Ratio |
|---|---|---|---|---|
| 91 | (I-1) | (II-9) | (II-10) | 30:35:35 |
| 92 | (I-2) | (II-1) | (II-3) | 26:37:37 |
| 93 | (I-2) | (II-3) | (II-4) | 20:40:40 |
| 94 | (I-2) | (II-4) | (II-100) | 24:38:38 |
| 95 | (I-3) | (II-1) | (II-3) | 20:40:40 |
| 96 | (I-3) | (II-3) | (II-4) | 22:39:39 |
| 97 | (I-3) | (II-3) | (II-100) | 25:50:25 |
| 98 | (I-4) | (II-2) | (II-12) | 30:50:20 |
| 99 | (I-5) | (II-1) | (II-3) | 20:40:40 |
| 100 | (I-5) | (II-4) | (II-100) | 24:38:38 |
| 101 | (I-5) | (II-9) | (II-10) | 16:42:42 |
| 102 | (I-6) | (II-4) | (II-100) | 30:35:35 |
| 103 | (I-7) | (II-3) | (II-4) | 20:40:40 |
| 104 | (I-7) | (II-4) | (II-100) | 15:50:35 |
| 105 | (I-9) | (II-1) | (II-4) | 10:45:45 |
| 106 | (I-26) | (II-15) | (II-23) | 30:35:35 |
| 107 | (I-36) | (II-1) | (II-3) | 22:39:39 |
| 108 | (I-39) | (II-2) | (II-3) | 25:50:25 |
| 109 | (I-40) | (II-22) | (II-27) | 20:20:60 |
| 110 | (I-41) | (II-27) | (II-100) | 25:45:30 |

-continued

| Example | General formula (I) dye | 1st General formula (II) dye | 2nd General formula (II) dye | Ratio |
|---|---|---|---|---|
| 111 | (I-45) | (II-4) | (II-6) | 30:50:20 |
| 112 | (I-47) | (II-8) | (II-22) | 35:15:50 |

Dye Mixtures as per Example 10

| Example | General formula (I) dye | 1st General formula (II) dye | 2nd General formula (II) dye | Ratio |
|---|---|---|---|---|
| 113 | (I-1) | (II-3) | (II-4) | 30:35:35 |
| 114 | (I-2) | (II-14) | (II-24) | 40:40:20 |
| 115 | (I-3) | (II-9) | (II-10) | 24:38:38 |
| 116 | (I-4) | (II-2) | (II-12) | 30:40:30 |
| 117 | (I-5) | (II-14) | (II-24) | 40:35:25 |
| 118 | (I-6) | (II-6) | (II-13) | 50:25:25 |
| 119 | (I-7) | (II-7) | (II-22) | 25:30:45 |
| 120 | (I-9) | (II-3) | (II-100) | 10:45:45 |
| 121 | (I-26) | (II-23) | (II-31) | 35:45:20 |
| 122 | (I-45) | (II-2) | (II-3) | 25:40:35 |
| 123 | (I-47) | (II-23) | (II-31) | 30:50:20 |

Dye Mixtures as per Example 7

| Example | General formula (I) dye | General formula (II) dye | (I):(II) ratio |
|---|---|---|---|
| 124 | (I-9) | (II-33) | 30:70 |
| 125 | (I-10) | (II-33) | 20:80 |
| 126 | (I-14) | (II-33) | 25:75 |
| 127 | (I-15) | (II-33) | 50:50 |
| 128 | (I-16) | (II-33) | 60:40 |
| 129 | (I-17) | (II-33) | 33:67 |
| 130 | (I-24) | (II-33) | 70:30 |
| 131 | (I-38) | (II-33) | 15:85 |
| 132 | (I-41) | (II-33) | 65:35 |
| 133 | (I-43) | (II-33) | 25:75 |
| 134 | (I-44) | (II-33) | 60:40 |

Dye Mixtures as per Example 11 or 12

| Example | General formula (I) dye | General formula (II) dye | General formula (G) dye | (I):(II):(G) ratio |
|---|---|---|---|---|
| 135 | (I-1) | (II-6) | (Ga-2) | 50:30:20 |
| 136 | (I-2) | (II-24) | (Ga-1) | 45:40:15 |
| 137 | (I-3) | (II-3) | | 40:10:50 |

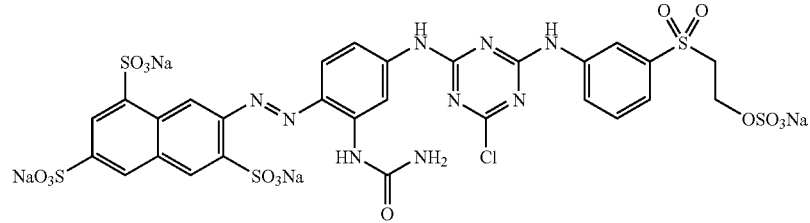

(Gf-1)

-continued
| Example | General formula (I) dye | General formula (II) dye | General formula (G) dye | (I):(II):(G) ratio |
|---|---|---|---|---|
| 138 | (I-3) | (II-7) | (Ga-2) | 60:15:25 |
| 139 | (I-3) | (II-22) | (Ga-2) | 60:30:10 |
| 140 | (I-4) | (II-100) | (Ga-2) | 30:50:20 |
| 141 | (I-5) | (II-14) | 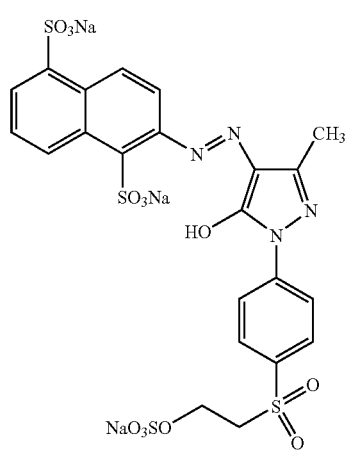 (Gc-1) | 60:20:20 |
| 142 | (I-6) | (II-2) | 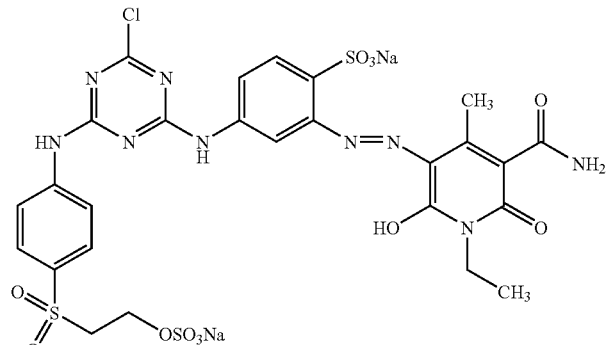 (Gd-1) | 55:25:20 |
| 143 | (I-7) | (II-13) | 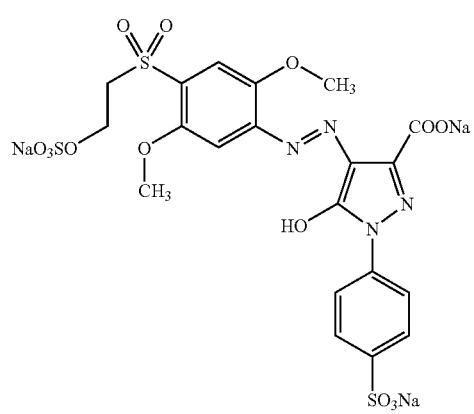 (Gc-2) | 50:20:30 |

-continued

| Example | General formula (I) dye | General formula (II) dye | General formula (G) dye | (I):(II):(G) ratio |
|---|---|---|---|---|
| 144 | (I-9) | (II-4) | (Gc-1) | 10:55:35 |
| 145 | (I-26) | (II-23) | (Gd-2) | 30:55:15 |
| 146 | (I-36) | (II-11) | (Gf-2) | 35:30:35 |
| 147 | (I-39) | (II-32) | (Gc-3) | 25:50:25 |

-continued
| Example | General formula (I) dye | General formula (II) dye | General formula (G) dye | (I):(II):(G) ratio |
|---|---|---|---|---|
| 148 | (I-41) | (II-27) | (Gc-4) | 30:45:25 |
| 149 | (I-41) | (II-27) | (Gf-3) | 25:50:25 |
| 150 | (I-45) | (II-12) | (Gb-2) | 20:45:35 |
| 151 | (I-47) | (II-31) | (Ga-5) | 40:20:40 |
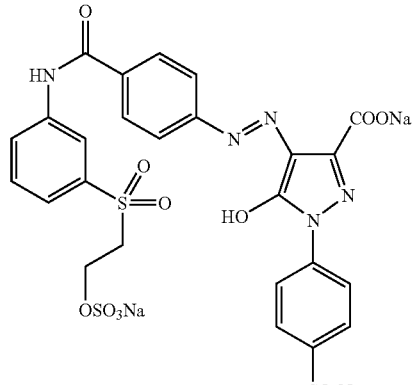
Dye Mixtures as per Example 13 or 14
| Example | General formula (I) dye | General formula (II) dye | General formula (G) dye | (I):(II):(G) ratio |
|---|---|---|---|---|
| 152 | (I-4) | (II-6) | (Gb-1) | 55:35:10 |
| 153 | (I-4) | (II-7) | (Gb-1) | 60:25:15 |
| 154 | (I-4) | (II-13) | (Gb-1) | 60:30:10 |
| 155 | (I-4) | (II-100) | (Gb-1) | 30:60:10 |
| 156 | (I-9) | (II-10) | (Gb-1) | 20:60:20 |
| 157 | (I-9) | (II-8) | (Gb-1) | 55:25:20 |
| 158 | (I-1) | (II-3) | (Gb-2) | 35:50:15 |
| 159 | (I-1) | (II-4) | (Gb-2) | 35:45:20 |
| 160 | (I-3) | (II-2) | (Gb-2) | 50:30:20 |
| 161 | (I-3) | (II-9) | (Gb-2) | 30:50:20 |
| 162 | (I-7) | (II-12) | (Gb-2) | 20:30:50 |
| 163 | (I-7) | (II-22) | (Gb-2) | 25:50:25 |

USE EXAMPLE 1

2 parts of a dye mixture obtained as per example 1-14 and 50 parts of sodium chloride are dissolved in 999 parts of water and 5 parts of sodium carbonate, 0.7 part of sodium hydroxide (in the form of a 32.5% aqueous solution) and, if appropriate, 1 part of a wetting agent are added. This dyebath is entered with 100 g of a woven cotton fabric. The temperature of the dyebath is initially maintained at 25° C. for 10 minutes, then raised to the final temperature (40-80° C.) over 30 minutes and maintained at the final temperature for a further 60-90 minutes. Thereafter, the dyed fabric is initially rinsed with tap water for 2 minutes and then with deionized water for 5 minutes. The dyed fabric is neutralized at 40° C. in 1000 parts of an aqueous solution which contains 1 part of 50% acetic acid for 10 minutes. It is rinsed again with deionized water at 70° C. and then soaked off at the boil with a laundry detergent for 15 minutes, rinsed once more and dried to provide a strong reddish orange to brownish red dyeing having very good fastness properties.

USE EXAMPLE 2

4 parts of a dye mixture obtained as per example 1-14 and 50 parts of sodium chloride are dissolved in 998 parts of water and 5 parts of sodium carbonate, 2 parts of sodium hydroxide (in the form of a 32.5% aqueous solution) and if appropriate 1 part of wetting agent are added. This dyebath is entered with 100 g of a woven cotton fabric. The rest of the processing is carried out as reported in use example 1 to provide a scarlet dyeing having very good fastness properties.

USE EXAMPLE 3

A textile fabric consisting of mercerized cotton is padded with a liquor containing 35 g/l of anhydrous sodium carbonate, 50 g/l of urea and 150 g/l of a low viscosity sodium alginate solution (6%) and then dried. The wet pickup is 70%. The thus pretreated textile is printed with an aqueous ink containing
8% of a dye mixture as per any of examples 1-14
20% of 1,2-propanediol
0.01% of Mergal K9N and
71.99% of water
using a drop-on-demand (bubble jet) inkjet print head. The print is fully dried. It is fixed by means of saturated steam at 102° C. for 8 minutes. The print is then rinsed warm, subjected to a fastness wash with hot water at 95° C., rinsed warm and then dried. The result is an orange to red print having excellent service fastnesses.

USE EXAMPLE 4

A textile fabric consisting of mercerized cotton is padded with a liquor containing 35 g/l of anhydrous sodium carbonate, 100 g/l of urea and 150 g/l of a low viscosity sodium alginate solution (6%) and then dried. The wet pickup is 70%. The thus pretreated textile is printed with an aqueous ink containing
8% of a dye mixture as per any of examples 1-14
15% of N-methylpyrrolidone
0.01% of Mergal K9N and
76.99% of water
using a drop-on-demand (bubble jet) inkjet print head. The print is fully dried. It is fixed by means of saturated steam at 102° C. for 8 minutes. The print is then rinsed warm, subjected to a fastness wash with hot water at 95° C., rinsed warm and then dried. The result is an orange to red print having excellent service fastnesses.

What is claimed is:

1. A reactive dye mixture which comprise from 20% to 80% by weight of one or more dyes of the formula (I-a)

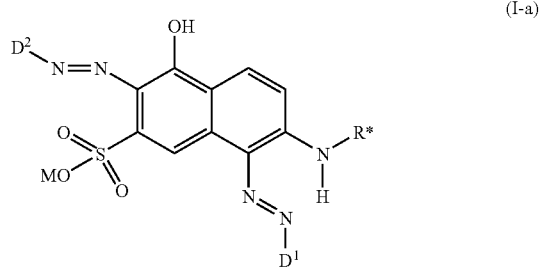

and from 20% to 80% by weight of one or more dyes of the formula (II-a)

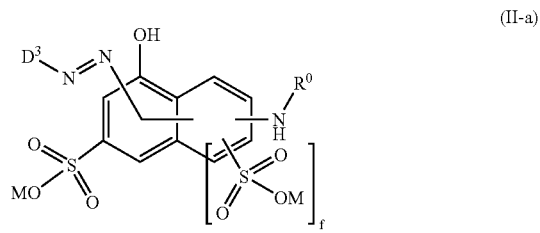

wherein
$D^1$ is a group of the formula (I)

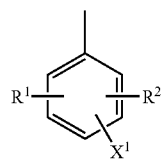

wherein
$R^1$ hydrogen,
$R^2$ is sulfo,
$X^1$ is a group of the formula $-SO_2-Z$,
where
Z is $-CH=CH_2$ or β-sulfatoethyl;
$D^2$ is a group of the formula (1')

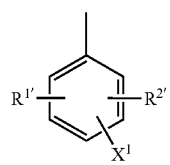

wherein
$R^{1'}$ is hydrogen or,
$R^{2'}$ is $(C_1-C_4)$-alkoxy,
$X^1$ is defined above,
$D^3$ is a naphthyl group of the formula (2)

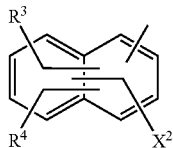

(2)

where
R³ and R⁴ are sulfo; and
X² is hydrogen;
R⁰ a group of the formula (5)

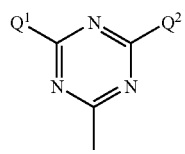

(5)

where
Q¹ is chlorine; and Q² is a group of the formula (7)

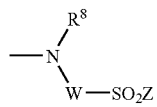

(7)

wherein
R⁸ is hydrogen;
W is phenylene, which is unsubstituted; and
Z is —CH=CH₂ or β-sulfatoethyl;
R* is a group of the formula (14)

—CH₂—SO₃M     (14);

f is 1; and
M is hydrogen, an alkali metal or one equivalent of an alkaline earth metal.

2. The reactive dye mixture as claimed in claim 1, further comprising one or more monoazo dyes of the formulae (15) to (16), each in an amount of 0-10% by weight

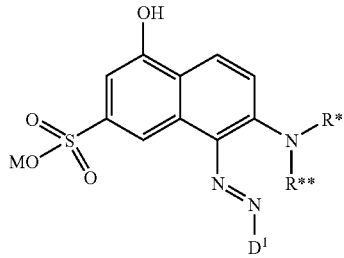

(15)

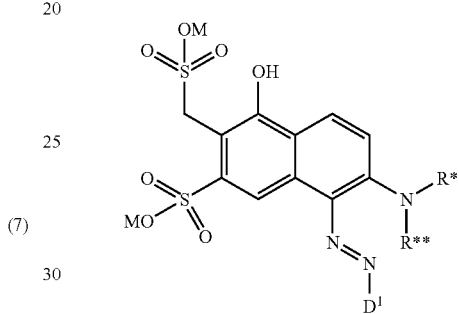

(16)

where M, R*, R and D¹ are each as defined in claim 1**, with at least one dye of the formula (15) or (16) being present.

3. The reactive dye mixture as claimed in claim 1, further comprising, as a further blending or shading component, at least one dye conforming to the hereinbelow indicated and defined formulae (Ga)-(Gf)

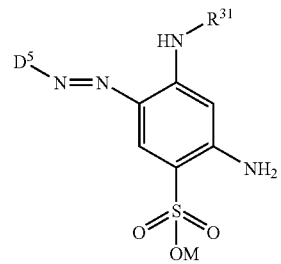

(Ga)

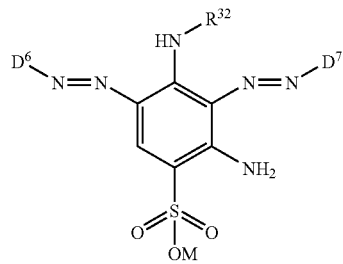

(Gb)

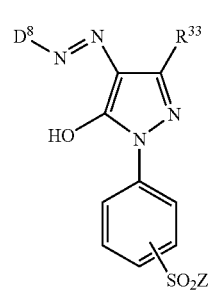

(Gc)

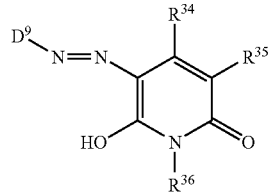

(Gd)

-continued

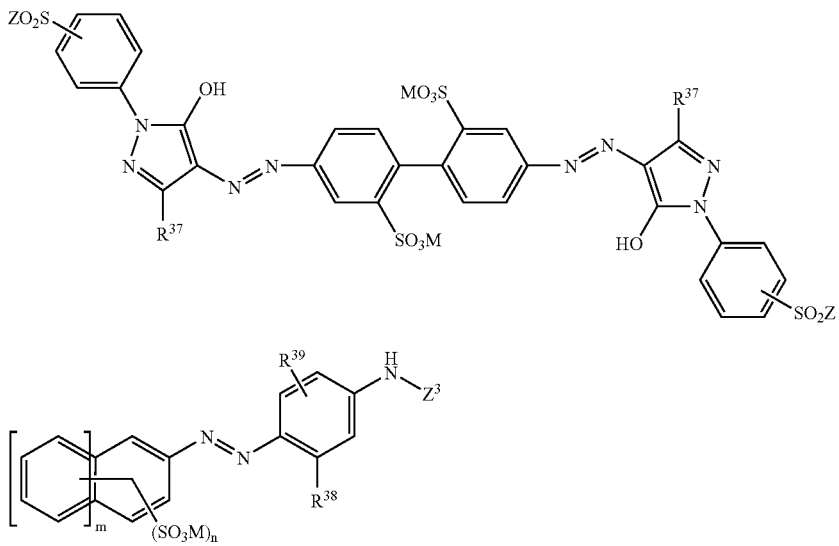

(Ge)

(Gf)

where $D^5$, $D^6$, $D^7$, $D^8$ and $D^9$ have one of the meanings of $D^1$, $D^2$ or $D^3$, wherein $D^5$, when $R^{31}$ is not a group of the formula (4) or (5), and also $D^6$ or $D^7$ and $D^9$ contain at least one fiber-reactive group of the formula —$SO_2Z$ or $Z^2$;

$R^{31}$ is hydrogen, acetyl, carbamoyl, sulfomethyl or a group of the formula (4-1) or (5-1)

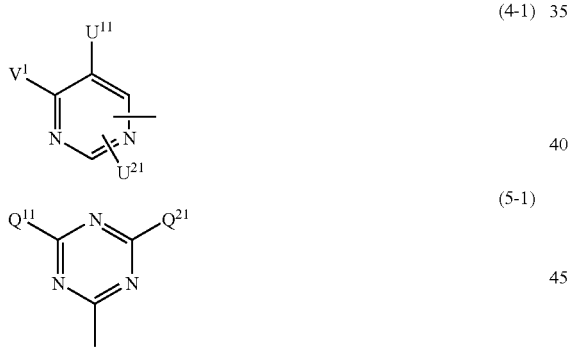

(4-1)

(5-1)

where $V^1$ is fluorine or chlorine;

$U^{11}$ and $U^{21}$ are independently fluorine, chlorine or hydrogen; and $Q^{11}$ and $Q^{21}$ are independently chlorine, fluorine, cyanamido, hydroxyl, $(C_1-C_6)$-alkoxy, phenoxy, sulfophenoxy, mercapto, $(C_1-C_6)$-alkylmercapto, pyridino, carboxypyridino, carbamoylpyridino or a group of the general formula (7-1) or (8-1)

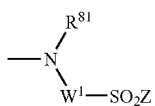

(7-1)

-continued (8-1)

where $R^{81}$ is hydrogen or $(C_1-C_6)$-alkyl, sulfo-$(C_1-C_6)$-alkyl or phenyl which is unsubstituted or substituted by $(C_1-C_4)$-alkyl, $(C_1-C_4)$-alkoxy, sulfo, halogen, carboxyl, acetamido, ureido;

$R^{91}$ and $R^{100}$ independently have one of the meanings of $R^{81}$ or combine to form a cyclic ring system of the formula —$(CH_2)_j$—, wherein j is 4 or 5, or alternatively —$(CH_2)_2$-E-$(CH_2)_2$—, wherein E is oxygen, sulfur, sulfonyl, —$NR^{11}$ where $R^{11}=(C_1-C_6)$-alkyl;

$W^1$ is phenylene, which is unsubstituted or substituted by 1 or 2 substituents, wherein the 1 or 2 substituents are $(C_1-C_4)$-alkyl, $(C_1-C_4)$-alkoxy, carboxyl, sulfo, chlorine, bromine, or is $(C_1-C_4)$-alkylenearylene or $(C_2-C_6)$-alkylene, which may be interrupted by oxygen, sulfur, sulfonyl, amino, carbonyl, carboxamido, or is phenylene-CONH-phenylene which is unsubstituted or substituted by $(C_1-C_4)$-alkyl, $(C_1-C_4)$-alkoxy, hydroxyl, sulfo, carboxyl, amido, ureido or halogen, or is naphthylene which is unsubstituted or substituted by one or two sulfo groups; and Z is as defined in claim 1, $R^{32}$ is hydrogen or sulfomethyl, $R^{33}$ is methyl, carboxyl or carboxyalkyl with $C_1$- to $C_4$-alkyl, $R^{34}$ is hydrogen or methyl, $R^{35}$ is hydrogen, cyano, carbamoyl, carboxyl or sulfomethyl, $R^{36}$ is methyl, ethyl or β-sulfoethyl, $R^{37}$ is methyl, carboxyl or carboxyalkyl with $C_1$- to $C_4$-alkyl, $R^{38}$ is acetamido, ureido or methyl, $R^{39}$ is hydrogen, methyl or methoxy, m is 0 or 1, n is 1, 2 or 3, $Z^3$ has one of the meanings of $Z^2$, and M and Z are each as defined in claim 1.

4. Aqueous liquid product comprising a dye mixture according to claim 1 having a total dye content of 5-50% by weight.

5. Aqueous printing inks for textile printing by the inkjet process, comprising dye mixtures as claimed in claim 1 in amounts from 0.01% by weight to 40% by weight based on the total weight of the inks.

6. A process for dyeing, printing and also inkjet printing textile fiber materials, which comprises utilizing dye mixtures as claimed in claim 1.

7. The reactive dye mixture as claimed in claim 2, further comprising as a further blending or shading component, at least one dye conforming to the hereinbelow indicated and defined formulae (Ga)-(Gf)

where $D^5$, $D^6$, $D^7$, $D^8$ and $D^9$ have one of the meanings of $D^1$, $D^2$ or $D^3$, wherein $D^5$, when $R^{31}$ is not a group of the general formula (4) or (5), and also $D^6$ or $D^7$ and $D^9$ contain at least one fiber-reactive group of the formula —$SO_2Z$ or $Z^2$;

$R^{31}$ is hydrogen, acetyl, carbamoyl, sulfomethyl or a group of the general formula (4-1) or (5-1)

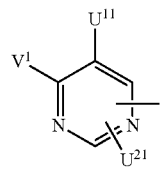
(4-1)

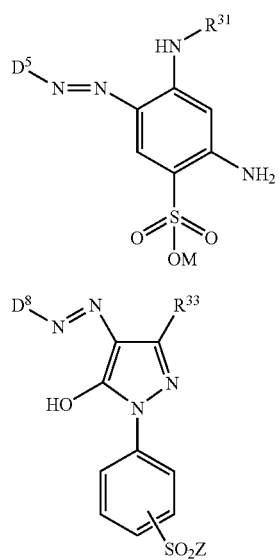
(Ga)

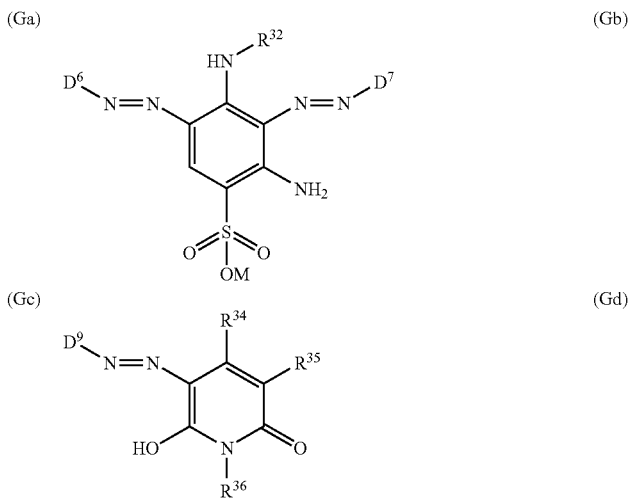
(Gb)

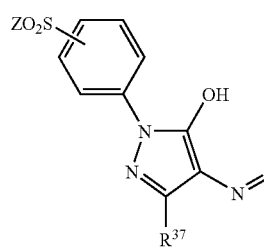
(Gc)

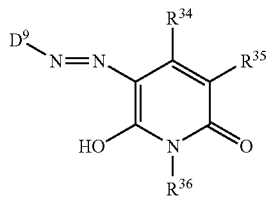
(Gd)

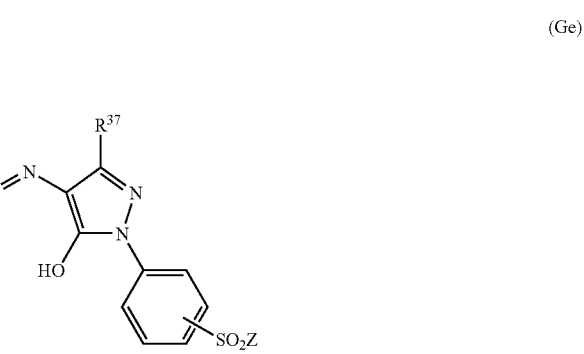
(Ge)

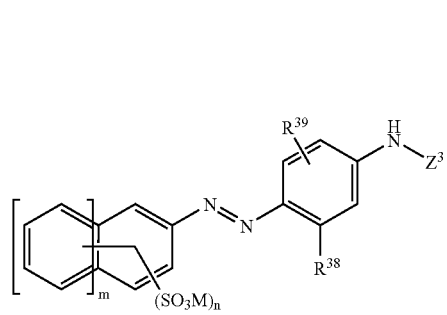
(Gf)

-continued

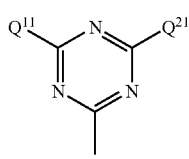

(5-1)

where
$V^1$ is fluorine or chlorine;
$U^{11}$ and $U^{21}$ are independently fluorine, chlorine or hydrogen; and
$Q^{11}$ and $Q^{21}$ are independently chlorine, fluorine, cyanamido, hydroxyl, $(C_1-C_6)$-alkoxy, phenoxy, sulfophenoxy, mercapto, $(C_1-C_6)$-alkylmercapto, pyridino, carboxypyridino, carbamoylpyridino or a group of the general formula (7-1) or (8-1)

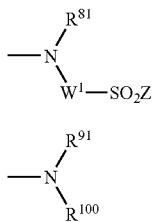

(7-1)

(8-1)

where
$R^{81}$ is hydrogen or $(C_1-C_6)$-alkyl, sulfo-$(C_1-C_6)$-alkyl or phenyl which is unsubstituted or substituted by $(C_1-C_4)$-alkyl, $(C_1-C_4)$-alkoxy, sulfo, halogen, carboxyl, acetamido, ureido;
$R^{91}$ and $R^{100}$ independently have one of the meanings of $R^{81}$ or combine to form a cyclic ring system of the formula —$(CH_2)_j$—, wherein j is 4 or 5, or alternatively —$(CH_2)_2$-E-$(CH_2)_2$—, wherein E is oxygen, sulfur, sulfonyl, —$NR^{11}$ where $R^{11}$=$(C_1-C_6)$-alkyl;

$W^1$ is phenylene, which is unsubstituted or substituted by 1 or 2 substituents, wherein the 1 or 2 substituents are $(C_1-C_4)$-alkyl, $(C_1-C_4)$-alkoxy, carboxyl, sulfo, chlorine, bromine, or is $(C_1-C_4)$-alkylenearylene or $(C_2-C_6)$-alkylene, which may be interrupted by oxygen, sulfur, sulfonyl, amino, carbonyl, carboxamido, or is phenylene-CONH-phenylene which is unsubstituted or substituted by $(C_1-C_4)$-alkyl, $(C_1-C_4)$-alkoxy, hydroxyl, sulfo, carboxyl, amido, ureido or halogen, or is naphthylene which is unsubstituted or substituted by one or two sulfo groups; and
Z is vinyl, β-chloroethyl or β-sulfatoethyl,
$R^{32}$ is hydrogen or sulfomethyl,
$R^{33}$ is methyl, carboxyl or carboxyalkyl with $C_1$- to $C_4$-alkyl,
$R^{34}$ is hydrogen or methyl,
$R^{35}$ is hydrogen, cyano, carbamoyl, carboxyl or sulfomethyl,
$R^{36}$ is methyl, ethyl or β-sulfoethyl,
$R^{37}$ is methyl, carboxyl or carboxyalkyl with $C_1$- to $C_4$-alkyl,
$R^{38}$ is acetamido, ureido or methyl,
$R^{39}$ is hydrogen, methyl or methoxy,
m is 0 or 1,
n is 1, 2 or 3,
$Z^3$ has one of the meanings of $Z^2$.

8. The process as claimed in claim 6, wherein the fiber materials are hydroxyl- and/or carboxamido-containing fiber materials.

9. The reactive dye mixture as claimed in claim 1, wherein
Z is β-sulfatoethyl,
M is hydrogen or sodium,
$R^{1'}$ is hydrogen or methyl, and
$R^{2'}$ is methoxy.

10. The reactive dye mixture as claimed in claim 1, which comprise from 25 to 75% by weight of one or more dyes of the formula (I-a) and from 25 to 75% by weight of one or more dyes of the formula (II-a).

* * * * *